(12) United States Patent
Bulusu et al.

(10) Patent No.: US 8,724,517 B1
(45) Date of Patent: May 13, 2014

(54) SYSTEM AND METHOD FOR MANAGING NETWORK TRAFFIC DISRUPTION

(75) Inventors: Shekher Bulusu, Fremont, CA (US); Sanjay Sane, Fremont, CA (US); Smita Rai, Mountain View, CA (US); Gayatri Ramachandran, Sunnyvale, CA (US); Ronak Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 306 days.

(21) Appl. No.: 13/152,200

(22) Filed: Jun. 2, 2011

(51) Int. Cl.
*H04L 12/28* (2006.01)
*H04L 12/56* (2006.01)

(52) U.S. Cl.
CPC ............... *H04L 45/48* (2013.01); *H04L 45/02* (2013.01); *H04L 45/00* (2013.01)
USPC .............................. 370/256; 370/254; 370/255

(58) Field of Classification Search
CPC .......... H04L 45/48; H04L 45/02; H04L 45/00
USPC ........................... 370/256, 218, 252, 254, 255
See application file for complete search history.

(56) References Cited

U.S. PATENT DOCUMENTS

| | | | |
|---|---|---|---|
| 4,006,320 A | 2/1977 | Markl | |
| 4,486,877 A | 12/1984 | Turner | |
| 4,569,042 A | 2/1986 | Larson | |
| 4,630,268 A | 12/1986 | Rodenbaugh | |
| 4,907,277 A | 3/1990 | Callens et al. | |
| 5,010,544 A | 4/1991 | Chang et al. | |
| 5,014,265 A | 5/1991 | Hahne et al. | |
| 5,121,382 A | 6/1992 | Yang et al. | |
| 5,159,592 A | 10/1992 | Perkins | |
| 5,243,342 A | 9/1993 | Kattemalalavadi et al. | |
| 5,265,092 A | 11/1993 | Soloway et al. | |
| 5,274,643 A | 12/1993 | Fisk | |
| 5,321,694 A | 6/1994 | Chang et al. | |
| 5,341,477 A | 8/1994 | Pitkin et al. | |
| 5,343,461 A | 8/1994 | Barton et al. | |
| 5,353,283 A | 10/1994 | Tsuchiya | |
| 5,371,852 A | 12/1994 | Attanasio et al. | |
| 5,394,402 A | 2/1995 | Ross | |
| 5,416,842 A | 5/1995 | Ariz | |
| 5,422,876 A | 6/1995 | Turudic | |

(Continued)

FOREIGN PATENT DOCUMENTS

| | | |
|---|---|---|
| WO | WO 2008/010918 | 1/2008 |
| WO | WO 2009/014967 | 1/2009 |

OTHER PUBLICATIONS

U.S. Appl. No. 13/160,957, filed Jun. 15, 2011, entitled "System and Method for Providing a Loop Free Topology in a Network Environment," Inventor(s): Shekher Bulusu, et al.

(Continued)

*Primary Examiner* — Chuong T Ho
(74) *Attorney, Agent, or Firm* — Patent Capital Group

(57) ABSTRACT

A method is provided that includes configuring a first network element as a peer to a second network element. The first network element and the second network element are configured to execute a spanning-tree protocol (STP) in a network environment. The method may also include configuring a priority characteristic to be a same value for the first network element and the second network element such that both operate as root network elements for other network elements in the network environment.

20 Claims, 12 Drawing Sheets

(56) References Cited

U.S. PATENT DOCUMENTS

| | | |
|---|---|---|
| 5,426,637 A | 6/1995 | Derby et al. |
| 5,430,715 A | 7/1995 | Corbalis et al. |
| 5,430,727 A | 7/1995 | Callon |
| 5,450,394 A | 9/1995 | Gruber |
| 5,450,449 A | 9/1995 | Kroon |
| 5,452,294 A | 9/1995 | Natarajan |
| 5,459,837 A | 10/1995 | Caccavale |
| 5,473,599 A | 12/1995 | Li et al. |
| 5,477,531 A | 12/1995 | McKee et al. |
| 5,491,692 A | 2/1996 | Gunner et al. |
| 5,500,851 A | 3/1996 | Kozaki et al. |
| 5,500,860 A | 3/1996 | Perlman et al. |
| 5,509,123 A | 4/1996 | Dobbins et al. |
| 5,519,704 A | 5/1996 | Farinacci et al. |
| 5,521,907 A | 5/1996 | Ennis et al. |
| 5,555,256 A | 9/1996 | Calamvokis |
| 5,561,669 A | 10/1996 | Lenny et al. |
| 5,563,875 A | 10/1996 | Hefel et al. |
| 5,594,732 A | 1/1997 | Bell et al. |
| 5,602,918 A | 2/1997 | Chen et al. |
| 5,604,803 A | 2/1997 | Aziz |
| 5,617,417 A | 4/1997 | Sathe et al. |
| 5,617,421 A | 4/1997 | Chin et al. |
| 5,621,721 A | 4/1997 | Vantuone |
| 5,623,492 A | 4/1997 | Teraslinna |
| 5,623,605 A | 4/1997 | Keshav et al. |
| 5,642,515 A | 6/1997 | Jones et al. |
| 5,650,993 A | 7/1997 | Lakshman et al. |
| 5,651,002 A | 7/1997 | Van Seters et al. |
| 5,659,542 A | 8/1997 | Bell et al. |
| 5,673,265 A | 9/1997 | Gupta et al. |
| 5,675,741 A | 10/1997 | Aggarwal et al. |
| 5,689,566 A | 11/1997 | Nguyen |
| 5,699,478 A | 12/1997 | Nahumi |
| 5,699,485 A | 12/1997 | Shoham |
| 5,708,502 A | 1/1998 | Denton et al. |
| 5,715,399 A | 2/1998 | Bezos |
| 5,740,171 A | 4/1998 | Mazzola et al. |
| 5,740,176 A | 4/1998 | Gupta et al. |
| 5,742,604 A | 4/1998 | Edsall et al. |
| 5,764,636 A | 6/1998 | Edsall |
| 5,793,763 A | 8/1998 | Mayes et al. |
| 5,812,528 A | 9/1998 | VanDervort |
| 5,819,089 A | 10/1998 | White |
| 5,835,494 A | 11/1998 | Hughes et al. |
| 5,838,994 A | 11/1998 | Valizadeh |
| 5,850,388 A | 12/1998 | Anderson et al. |
| 5,867,666 A | 2/1999 | Harvey |
| 5,870,397 A | 2/1999 | Chauffour et al. |
| 5,870,557 A | 2/1999 | Bellovin et al. |
| 5,884,010 A | 3/1999 | Chen et al. |
| 5,894,556 A | 4/1999 | Grimm et al. |
| 5,905,871 A | 5/1999 | Buskens et al. |
| 5,917,820 A | 6/1999 | Rekhter |
| 5,918,017 A | 6/1999 | Attanasio et al. |
| 5,918,019 A | 6/1999 | Valencia |
| 5,931,961 A | 8/1999 | Ranganathan et al. |
| 5,943,347 A | 8/1999 | Shepard |
| 5,983,265 A | 11/1999 | Martino, II |
| 5,987,011 A | 11/1999 | Toh |
| 5,991,809 A | 11/1999 | Kriegsman |
| 6,003,079 A | 12/1999 | Friedrich et al. |
| 6,006,264 A | 12/1999 | Colby et al. |
| 6,009,081 A | 12/1999 | Wheeler et al. |
| 6,018,516 A | 1/2000 | Packer |
| 6,023,455 A | 2/2000 | Takahashi |
| 6,023,733 A | 2/2000 | Periasamy et al. |
| 6,031,846 A | 2/2000 | Gurusami et al. |
| 6,032,194 A | 2/2000 | Gai et al. |
| 6,041,352 A | 3/2000 | Burdick et al. |
| 6,061,454 A | 5/2000 | Malik et al. |
| 6,070,190 A | 5/2000 | Reps et al. |
| 6,078,590 A | 6/2000 | Farinacci et al. |
| 6,078,956 A | 6/2000 | Bryant et al. |
| 6,088,717 A | 7/2000 | Reed et al. |
| 6,094,562 A | 7/2000 | Zhong |
| 6,101,180 A | 8/2000 | Donahue et al. |
| 6,104,695 A | 8/2000 | Wesley et al. |
| 6,115,711 A | 9/2000 | White |
| 6,115,752 A | 9/2000 | Chauhan |
| 6,118,765 A | 9/2000 | Phillips |
| 6,118,796 A | 9/2000 | Best et al. |
| 6,185,203 B1 | 2/2001 | Berman |
| 6,192,036 B1 | 2/2001 | Buhler et al. |
| 6,230,271 B1 | 5/2001 | Wadlow et al. |
| 6,252,851 B1 | 6/2001 | Siu et al. |
| 6,275,471 B1 | 8/2001 | Bushmitch et al. |
| 6,278,687 B1 | 8/2001 | Hunneyball |
| 6,286,045 B1 | 9/2001 | Griffiths et al. |
| 6,317,775 B1 | 11/2001 | Coile et al. |
| 6,337,861 B1 | 1/2002 | Rosen |
| 6,356,545 B1 | 3/2002 | Vargo et al. |
| 6,363,477 B1 | 3/2002 | Fletcher et al. |
| 6,389,006 B1 | 5/2002 | Bialik |
| 6,445,717 B1 | 9/2002 | Gibson et al. |
| 6,446,121 B1 | 9/2002 | Shah et al. |
| 6,510,150 B1 | 1/2003 | Ngo |
| 6,515,967 B1 | 2/2003 | Wei et al. |
| 6,526,044 B1 | 2/2003 | Cookmeyer et al. |
| 6,535,490 B1 | 3/2003 | Jain |
| 6,563,796 B1 | 5/2003 | Saito |
| 6,578,066 B1 | 6/2003 | Logan et al. |
| 6,584,438 B1 | 6/2003 | Manjunath et al. |
| 6,614,781 B1 | 9/2003 | Elliott et al. |
| 6,628,624 B1 | 9/2003 | Mahajan et al. |
| 6,665,637 B2 | 12/2003 | Bruhn |
| 6,680,921 B1 | 1/2004 | Svanbro et al. |
| 6,687,225 B1 | 2/2004 | Kawari et al. |
| 6,687,360 B2 | 2/2004 | Kung et al. |
| 6,700,874 B1 | 3/2004 | Takihiro et al. |
| 6,725,191 B2 | 4/2004 | Mecayten |
| 6,731,609 B1 | 5/2004 | Hirni et al. |
| 6,741,600 B1 | 5/2004 | Weiss et al. |
| 6,757,654 B1 | 6/2004 | Westerlund et al. |
| 6,765,881 B1 | 7/2004 | Rajakarunanayake |
| 6,775,703 B1 | 8/2004 | Burns et al. |
| 6,785,261 B1 | 8/2004 | Schuster et al. |
| 6,798,739 B1 | 9/2004 | Lee |
| 6,804,244 B1 | 10/2004 | Anandakumar et al. |
| 6,836,804 B1 | 12/2004 | Jagadeesan |
| 6,839,353 B1 | 1/2005 | DeJager |
| 6,845,091 B2 | 1/2005 | Ogier et al. |
| 6,901,048 B1 | 5/2005 | Wang et al. |
| 6,917,983 B1 | 7/2005 | Li |
| 6,940,821 B1 | 9/2005 | Wei et al. |
| 6,944,132 B1 | 9/2005 | Aono et al. |
| 6,947,381 B2 | 9/2005 | Wen et al. |
| 7,013,267 B1 | 3/2006 | Huart et al. |
| 7,024,257 B2 | 4/2006 | Pearce et al. |
| 7,039,716 B1 | 5/2006 | Jagadeesan |
| 7,047,190 B1 | 5/2006 | Kapilow |
| 7,068,607 B2 | 6/2006 | Paratain et al. |
| 7,069,034 B1 | 6/2006 | Sourour |
| 7,072,968 B2 | 7/2006 | Mikami et al. |
| 7,099,820 B1 | 8/2006 | Huart et al. |
| 7,133,368 B2 | 11/2006 | Zhang et al. |
| 7,143,184 B1 | 11/2006 | Shah et al. |
| 7,212,517 B2 | 5/2007 | Dzik |
| 7,283,474 B1 | 10/2007 | Bergenwall |
| 7,286,467 B1 | 10/2007 | Sylvain |
| 7,289,454 B2 | 10/2007 | Bovo et al. |
| 7,310,334 B1 | 12/2007 | FitzGerald et al. |
| 7,336,620 B2 | 2/2008 | Bennett |
| 7,352,700 B2 | 4/2008 | Chan et al. |
| 7,352,705 B1 | 4/2008 | Adhikari et al. |
| 7,406,034 B1 | 7/2008 | Cometto et al. |
| 7,417,993 B1 | 8/2008 | Ebergen et al. |
| 7,426,577 B2 | 9/2008 | Bardzil et al. |
| 7,457,877 B1 | 11/2008 | Shah et al. |
| 7,483,370 B1 | 1/2009 | Dayal et al. |
| 7,496,044 B1 | 2/2009 | Wing |
| 7,519,006 B1 | 4/2009 | Wing |
| 7,564,858 B1 | 7/2009 | Moncada-Elias et al. |
| 7,643,430 B2 | 1/2010 | Morandin |

(56) References Cited

U.S. PATENT DOCUMENTS

| | | | |
|---|---|---|---|
| 7,660,314 B2 | 2/2010 | Wybenga et al. | |
| 7,672,227 B2 | 3/2010 | Santoso et al. | |
| 7,729,267 B2 | 6/2010 | Oran et al. | |
| 7,760,735 B1 | 7/2010 | Chen et al. | |
| 7,817,580 B2 | 10/2010 | Jain et al. | |
| 7,864,712 B2 | 1/2011 | Khan et al. | |
| 7,870,611 B2 | 1/2011 | Ishikawa | |
| 7,886,080 B2 | 2/2011 | Sajassi et al. | |
| 7,944,470 B2 | 5/2011 | Foster et al. | |
| 7,969,894 B2 | 6/2011 | Mangal | |
| 8,065,317 B2 | 11/2011 | Wang et al. | |
| 8,116,213 B2 | 2/2012 | Krygowski | |
| 8,174,996 B2 | 5/2012 | Omar | |
| 8,244,909 B1 | 8/2012 | Hanson et al. | |
| 8,291,077 B2 | 10/2012 | I'Anson | |
| 8,582,467 B2* | 11/2013 | Hirota et al. | 370/254 |
| 2002/0003775 A1 | 1/2002 | Nakano et al. | |
| 2002/0067693 A1 | 6/2002 | Kodialam et al. | |
| 2002/0073375 A1 | 6/2002 | Hollander | |
| 2002/0083186 A1 | 6/2002 | Stringer | |
| 2003/0053419 A1 | 3/2003 | Kanazawa et al. | |
| 2003/0072269 A1 | 4/2003 | Teruhi et al. | |
| 2003/0097438 A1 | 5/2003 | Bearden et al. | |
| 2003/0110276 A1 | 6/2003 | Riddle | |
| 2003/0137972 A1 | 7/2003 | Kowalewski et al. | |
| 2003/0142680 A1 | 7/2003 | Oguchi | |
| 2003/0163772 A1 | 8/2003 | Jaworski | |
| 2003/0165114 A1 | 9/2003 | Kusama et al. | |
| 2003/0208616 A1 | 11/2003 | Laing et al. | |
| 2003/0219022 A1 | 11/2003 | Dillon et al. | |
| 2003/0220971 A1 | 11/2003 | Kressin | |
| 2003/0225549 A1 | 12/2003 | Shay | |
| 2004/0008715 A1 | 1/2004 | Barrack et al. | |
| 2004/0052257 A1 | 3/2004 | Abdo et al. | |
| 2004/0073690 A1 | 4/2004 | Hepworth et al. | |
| 2004/0114539 A1 | 6/2004 | Beshai et al. | |
| 2004/0125965 A1 | 7/2004 | Alberth et al. | |
| 2004/0170163 A1 | 9/2004 | Yik et al. | |
| 2004/0184323 A1 | 9/2004 | Mori et al. | |
| 2004/0193709 A1 | 9/2004 | Selvaggi et al. | |
| 2004/0218617 A1 | 11/2004 | Sagfors | |
| 2004/0223458 A1 | 11/2004 | Gentle | |
| 2004/0240431 A1 | 12/2004 | Makowski et al. | |
| 2004/0252646 A1 | 12/2004 | Adhikari et al. | |
| 2005/0036519 A1 | 2/2005 | Balakrishnan et al. | |
| 2005/0105474 A1 | 5/2005 | Metzler | |
| 2005/0111487 A1 | 5/2005 | Matta et al. | |
| 2005/0117576 A1 | 6/2005 | McDysan et al. | |
| 2005/0152406 A2 | 7/2005 | Chauveau | |
| 2005/0216599 A1 | 9/2005 | Anderson et al. | |
| 2005/0220123 A1 | 10/2005 | Wybenga et al. | |
| 2005/0226172 A1 | 10/2005 | Richardson | |
| 2005/0243733 A1 | 11/2005 | Crawford et al. | |
| 2005/0246041 A1 | 11/2005 | Kreifeldt et al. | |
| 2005/0259597 A1 | 11/2005 | Benedetto et al. | |
| 2005/0283639 A1 | 12/2005 | Le Pennec et al. | |
| 2005/0286419 A1 | 12/2005 | Joshi et al. | |
| 2005/0286436 A1 | 12/2005 | Flask | |
| 2006/0007869 A1* | 1/2006 | Hirota et al. | 370/244 |
| 2006/0018333 A1 | 1/2006 | Windisch et al. | |
| 2006/0041431 A1 | 2/2006 | Maes | |
| 2006/0098586 A1 | 5/2006 | Farrell et al. | |
| 2006/0104217 A1 | 5/2006 | Lehane | |
| 2006/0104306 A1 | 5/2006 | Adamczyk et al. | |
| 2006/0112400 A1 | 5/2006 | Zhang et al. | |
| 2006/0122835 A1 | 6/2006 | Huart et al. | |
| 2006/0133286 A1 | 6/2006 | Elie-Dit-Cosaque et al. | |
| 2006/0140136 A1 | 6/2006 | Filsfils et al. | |
| 2006/0159029 A1 | 7/2006 | Samuels et al. | |
| 2006/0179338 A1 | 8/2006 | Sumner | |
| 2006/0215684 A1 | 9/2006 | Capone | |
| 2006/0250967 A1 | 11/2006 | Miller et al. | |
| 2006/0268742 A1 | 11/2006 | Chu et al. | |
| 2006/0274760 A1 | 12/2006 | Loher | |
| 2006/0280130 A1 | 12/2006 | Nomura et al. | |
| 2006/0291385 A1 | 12/2006 | Yang | |
| 2007/0041335 A1 | 2/2007 | Znamova et al. | |
| 2007/0058571 A1 | 3/2007 | Rose | |
| 2007/0064616 A1 | 3/2007 | Miranda | |
| 2007/0107034 A1 | 5/2007 | Gotwals | |
| 2007/0127395 A1 | 6/2007 | Jain et al. | |
| 2007/0150480 A1 | 6/2007 | Hwang et al. | |
| 2007/0153774 A1 | 7/2007 | Shay et al. | |
| 2007/0171835 A1 | 7/2007 | Gobara et al. | |
| 2007/0204017 A1 | 8/2007 | Maes | |
| 2007/0212065 A1 | 9/2007 | Shin et al. | |
| 2007/0223462 A1 | 9/2007 | Hite et al. | |
| 2007/0258359 A1* | 11/2007 | Ogasawara et al. | 370/218 |
| 2007/0263554 A1 | 11/2007 | Finn | |
| 2007/0286165 A1 | 12/2007 | Chu et al. | |
| 2008/0019282 A1 | 1/2008 | Alaria et al. | |
| 2008/0031149 A1 | 2/2008 | Hughes et al. | |
| 2008/0031154 A1 | 2/2008 | Niazi et al. | |
| 2009/0022069 A1 | 1/2009 | Khan et al. | |
| 2009/0028044 A1 | 1/2009 | Windisch et al. | |
| 2009/0059800 A1 | 3/2009 | Mohan | |
| 2009/0080334 A1 | 3/2009 | DeCusatis et al. | |
| 2009/0125595 A1 | 5/2009 | Maes | |
| 2009/0144403 A1 | 6/2009 | Sajassi et al. | |
| 2009/0175274 A1 | 7/2009 | Aggarwal et al. | |
| 2009/0193057 A1 | 7/2009 | Maes | |
| 2009/0201937 A1 | 8/2009 | Bragg et al. | |
| 2009/0219823 A1 | 9/2009 | Qian et al. | |
| 2009/0219836 A1* | 9/2009 | Khan et al. | 370/256 |
| 2009/0274153 A1 | 11/2009 | Kuo et al. | |
| 2009/0296588 A1 | 12/2009 | Nishi et al. | |
| 2009/0328051 A1 | 12/2009 | Maes | |
| 2010/0049826 A1 | 2/2010 | Maes | |
| 2010/0061254 A1 | 3/2010 | Thottakkara et al. | |
| 2010/0061269 A1 | 3/2010 | Banerjee et al. | |
| 2010/0069052 A1 | 3/2010 | Ahomaki et al. | |
| 2010/0182937 A1 | 7/2010 | Bellagamba | |
| 2010/0189118 A1 | 7/2010 | Nonaka | |
| 2010/0226244 A1 | 9/2010 | Mizutani et al. | |
| 2010/0302936 A1 | 12/2010 | Jan et al. | |
| 2011/0019678 A1 | 1/2011 | Mehta et al. | |
| 2011/0134804 A1 | 6/2011 | Maes | |
| 2012/0106339 A1 | 5/2012 | Mishra et al. | |

OTHER PUBLICATIONS

U.S. Appl. No. 11/297,882, filed Dec. 7, 2005, entitled "Preventing Transient Loops in Broadcast/Multicast Trees During Distribution of Link State Information," Inventor: Sachin Jain.
U.S. Appl. No. 11/378,990, filed Mar. 17, 2006, entitled "Preventing Transient Loops in Broadcast/Multicast Trees During Distribution of Link State Information," Inventor: Sachin Jain.
U.S. Appl. No. 11/490,806, filed Jul. 20, 2006, entitled "Methods and Apparatus for Improved Determination of Network Metrics," Inventor: Valentina Alaria.
U.S. Appl. No. 11/880,322, filed Jul. 20, 2007, entitled "Preventing Loops in Networks Operating Different Protocols to Provide Loop-Free Topology," Inventor: Tameen Khan.
U.S. Appl. No. 12/475,124, filed May 29, 2009, entitled "Transient Loops Prevention in a Hybrid Layer-2 Network," Inventor: Saurabh Jain.
U.S. Appl. No. 12/658,503, filed Feb. 5, 2010, entitled "Fault Isolation in Trill Networks," Inventor(s): Ali Sajassi et al.
U.S. Appl. No. 12/916,763, filed Nov. 1, 2010, entitled "Probing Specific Customer Flow in Layer-2 Multipath Networks," Inventor(s): Chandan Mishra et al.
U.S. Appl. No. 12/938,237, filed Nov. 2, 2010, entitled "System and Method for Providing Proactive Fault Monitoring in a Network Environment," Inventor(s): Chandan Mishra, et al.
U.S. Appl. No. 12/941,881, filed Nov. 8, 2010, entitled "System and Method for Providing a Loop Free Topology in a Network Environment," Inventor: Shekher Bulusu.
U.S. Appl. No. 13/041,148, filed Mar. 4, 2011, entitled "System and Method for Managing Topology Changes in a Network Environment," Inventor: Shekher Bulusu.
U.S. Appl. No. 13/077,262, filed Mar. 31, 2011, entitled "System and Method for Probing Multiple Paths in a Network Environment," Inventors: Hariharan Balasubramanian, et al.

(56) References Cited

OTHER PUBLICATIONS

Wikipedia, "IEEE 802.1ag," Connectivity Fault Management, retrieve and printed Nov. 2, 2010, 4 pages; http://en.wikipedia.org/wiki/IEEE_802.1ag.
G. Malkin, "Traceroute Using an IP Option," Network Working Group, RFC 1393, Jan. 1993, 8 pages; http://tools.ietf.org/pdf/rfc1393.pdf.
K. Kompella and G. Swallow, "Detecting Multi-Protocol Label Switched (MPLS) Data Plane Failures," Network Working Group, RFC 4379, Feb. 2006, 52 pages; http://tools.ietf.org/pdf/rfc4379.pdf.
PCT "International Preliminary Report on Patentability, Date of Issuance Jan. 20, 2009 (1 page), Written Opinion of the International Searching Authority, Date of Mailing Feb. 7, 2008 (6 pages) and International Search Report, Date of Mailing Feb. 7, 2008 (2 pages)," for PCT/US2007/015506.
PCT "International Preliminary Report on Patentability (dated Jan. 26, 2010; 1 page) and Written Opinion of the International Searching Authority and International Search Report (dated Oct. 2, 2008; 7 pages)," for PCT International Application PCT/US2008/070243.
IEEE Standards Department, "Virtual Bridged Local Area Networks—Amendment 6: Provider Backbone Bridges—IEEE P802.1ah/D4.2," © 2008, Institute of Electrical and Electronics Engineers, Inc., Mar. 26, 2008; 116 pages.
U.S. Appl. No. 12/938,237.
U.S. Appl. No. 12/941,881.
U.S. Appl. No. 13/077,828.
U.S. Appl. No. 13/041,148.
U.S. Appl. No. 13/160,957.
USPTO Aug. 26, 2013 Response to Jun. 20, 2013 Non-Final Office Action from U.S. Appl. No. 13/041,148.
USPTO Jun. 13, 2013 RCE Response to Mar. 26, 2013 Final Office Action from U.S. Appl. No. 12/938,237.
USPTO Jul. 19, 2013 Non-Final Office Action from U.S. Appl. No. 12/938,237.
USPTO Aug. 6, 2013 RCE Response to May 8, 2013 Final Office Action from U.S. Appl. No. 13/160,957.
Kessler, G., "Chapter 2.2 PING of TCP: A Primer on Internet and TCP/IP Tools," RFC 1739; Dec. 1994; www.ietf.org.
Callon et al., "A Framework for Multiprotocol Label Switching," IETF Network Working Group, Internet Draft draft-ietf-mpls-framework-02.txt, Nov. 21, 1997.
Deering, S., et al., "Internet Protocol Version 6," RFC 1883, Dec. 1995.
Feldman, N., "ARIS Specification," Internet Draft, Mar. 1997.
Gobrial, Margret N., "Evaluation of Border Gateway Protocol (BGP) Version 4(V4) in the Tactical Environment," Military Communications Conference, Oct. 21-24, 1996; Abstract Only http://ieeexplore.ieee.org/xpl/login.jsp?tp=&arnumber=569372&url=http%3A%2F%2Fieeexplore.ieee.org%2Fiel3%2F4198%2F12335%2F00569372.pdf%3Farnumber%3D569372.
Halabi, Bassam, *Internet Routing Architectures* (CISCO), Macmillan Technical Publishing, Apr. 23, 1997; Abstract and Table of Contents only. http://www.ciscopress.com/store/internet-routing-architectures-cisco-9781562056520.
Handley and V. Jacobson, "SDP: Session Description Protocol," RFC 2327; Apr. 1998, 43pgs.
Heinanen, J., "Multiprotocol Encapsulation over ATM Adaptation Layer 5," RFC 1483, Jul. 1993.
Jennings, C., "NAT Classification Test Results," Internet Draft draft-jennings-behave-test-results-02draft-jennings-behave-test-results-02.txt, Jun. 25, 2006.
Katsube, Y. et al., "Toshiba's Router Architecture Extensions for ATM: Overview," RFC 2098, Feb. 1997.
Laubach, M., "Classical IP and ARP over ATM," RFC 1577, Jan. 1994.
Laubach, M., "IP over ATM Working Group's Recommendations for the ATM Forum's Multiprotocol BOF Version 1," RFC 1754, Jan. 1995.
Liao et al., "Adaptive Recovery Techniques for Real-time Audio Streams," IEEE INFOCOM2001; Twentieth Annual Joint Conference of the IEE Computer and Communications Societies Proceedings, Apr. 22-26, 2001, vol. 2, pp. 815-823.
McGovern, M., et al., "CATNIP: Common Architecture for the Internet," RFC 1707, Oct. 1994.
Nagami, K., et al., "Toshiba's Flow Attribute Notification Protocol (FANP) Specification," RFC 2129, Apr. 1997.
Newman, P. et al., "Ipsilon Flow Management Protocol Specification for IPv4 Version 1.0," RFC 1953, May 1996.
Newman, P. et al., "Ipsilon's General Switch Management Protocol Specification Version 1.1," RFC 1987, Aug. 1996.
PCT Feb. 7, 2008 International Search Report for PCT/US2007/015506.
Perez, M., et al., "ATM Signaling Support for IP over ATM," RFC 1755, Feb. 1995.
Rosen et al., "A Proposed Architecture for MPLS," IETF Network Working Group, Internet Draft draft-ietf-mpls-arch-00.txt, Aug. 1997.
Rosen et al., "MPLS Label Stock Encoding," RFC 3032, Jan. 2001.
Rosenberg et al., "STUN—Simple Traversal of User Datagram Protocol (UDP) Through Network Address Translators (NATs)," Network Working Group, RFC 3489, Mar. 2003, 44 pgs.
Schulzrinne, H., et al., "RTP, A Transport Protocol for Real-Time Applications," Network Working Group RFC3550, Jul. 2003, 98 pages.
Smith, Bradley R., et al., "Securing the Border Gateway Routing Protocol," Global Telecommunications Conference, Nov. 18-22, 1996.
Townsley, et al., "Layer Two Tunneling Protocol, L2TP," Network Working Group, RFC 2661, Aug. 1999, 75 pages.
Ullman, R., "Rap: Internet Route Access Protocol," RFC 1476, Jun. 1993.
Viswanathan et al., "ARIS: Aggregate Route-Based IP Switching," Internet Draft, Mar. 1997.
Wang, Q. et al., "TCP-Friendly Congestion Control Schemes in the Internet," National Key Lab of Switching Technology and Telecommunication Networks, Beijing University of Posts & Telecommunications; 2001, pp. 211-216; http://www.sics.se/~runtong/11.pdf.
USPTO May 24, 2013 RCE Response to Final Office Action dated Feb. 27, 2013 from U.S. Appl. No. 12/941,881.
USPTO May 24, 2013 Supplemental Response to Final Office Action dated Feb. 27, 2013 from U.S. Appl. No. 12/941,881.
USPTO Jun. 14, 2014 Notice of Allowance from U.S. Appl. No. 12/941,881.
USPTO Jun. 20, 2013 Non-Final Office Action from U.S. Appl. No. 13/041,148.
USPTO May, 8, 2013 Final Office Action from U.S. Appl. No. 13/160,957.
USPTO Sep. 25, 2012 Non-Final Office Action from U.S. Appl. No. 12/941,881.
USPTO Dec. 11, 2012 Response to Sep. 25, 2012 Non-Final Office Action from U.S. Appl. No. 12/941,881.
USPTO 2012-26 Final Office Action from U.S. Appl. No. 12/941,881.
USPTO Mar. 26, 2013 Non-Final Office Action from U.S. Appl. No. 13/077,828.
USPTO Nov. 26, 2012 Non-Final Office Action from U.S. Appl. No. 12/938,237.
USPTO Feb. 22, 2013 Response to Nov. 26, 2012 Non-Final Office Action from U.S. Appl. No. 12/938,237.
USPTO Mar. 26, 2013 Final Office Action from U.S. Appl. No. 12/938,237.
USPTO Jan. 7, 2013 Non-Final Office Action from U.S. Appl. No. 13/160,957.
USPTO Apr. 2, 2013 Response to Non-Final Office Action dated Jan. 7, 2013 from U.S. Appl. No. 13/160,957.
Andreasan et al., "RTP No-Op Payload Format," Internet Draft <draft-wing-avt-rtp-noop-00.txt>, Internet Engineering Task Force, Feb. 2004, pp. 1-8.

(56) References Cited

OTHER PUBLICATIONS

Cheng, Jin et al., "Fast TCP: Motivation, Architecture, Algorithms, Performance," IEEE INFOCOM 2004, Aug. 2, 2004, 44 pages.

Fedyk, D., et al., ISIS Extensions Supporting IEEE 802.1aq Shortest Path Bridging, Network Working Group Internet Draft, Mar. 8, 2011, 42 pages; http://tools.ietf.org/html/draft-ietf-isis-ieee-aq-05.

IEEE Standards Department, "Virtual Bridged Local Area Networks—Amendment 9: Shortest Path Bridging—IEEE P802.1aq/D2.1," © 2009, Institute of Electrical and Electronics Engineers, Inc., Aug. 21, 2009; 208 pages.

Niccolini, S., et al. "How to store traceroute measurements and related metrics," Internet Draft draft-niccolini-ippm-storetraceroutes-02.txe., Oct. 24, 2005.

Woundy et al., "ARIS: Aggregate Route-Based IP Switching," Internet Draft draft-woundy-aris-ipswitching-00-txt, Nov. 1996.

Perlman, Radia, "Rbridges: Transparent Routing," in Proc. IEEE INFOCOM, Mar. 2004.

Perlman, et al., "Rbridges: Base Protocol Specification," IETF Draft <draft-ietf-trill-rbridge-protocol-11.txt>, Jan. 2009.

Touch, et al., Transparent Interconnection of Lots of Links (TRILL): Problem and Applicability Statement, RFC 5556, IETF, May 2009.

* cited by examiner

US 8,724,517 B1

SYSTEM AND METHOD FOR MANAGING NETWORK TRAFFIC DISRUPTION

TECHNICAL FIELD

This disclosure relates in general to the field of communications and, more particularly, to managing network traffic disruption.

BACKGROUND

Ethernet architectures have grown in complexity in recent years. This is due, at least in part, to diverse technologies that have emerged to accommodate a plethora of end users. For example, networking virtualization can provide additional functionalities within a networking environment, such as redundancy and fault tolerance. Network virtualization facilitates the management of diversely located network devices, and may centralize/reduce the administration of networks. Implementing virtualization within an Ethernet architecture can create additional issues within forwarding protocols. In certain network scenarios, topology information may not be current, accurate, and/or consistent. Such changes and inconsistencies can disrupt or block data information (e.g., the network traffic) transmitted or flowing through a network. Optimally managing network traffic disruptions presents a significant challenge to system designers, network operators, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided that includes configuring a first network element as a peer to a second network element. The first network element and the second network element are configured to execute a spanning-tree protocol (STP) in a network environment. The method may also include configuring a priority characteristic to be a same value for the first network element and the second network element such that both operate as root network elements for other network elements in a network environment.

In more particular embodiments, the method can include the first network element being configured to transmit Bridge Protocol Data Units (BPDUs) to the second network element through a Virtual Port-Channel (vPC) link. Additionally, data in the BPDUs can include a root bridge ID (BID) providing a value for a bridge priority, and the data in the BPDUs can also include a negotiated vPC media access control (VMAC) value. In more specific implementations, a first designated BID value can be provided to indicate that the first network element is a vPC operational primary switch, and a second designated BID value can be provided to indicate that the second network element is a vPC operational secondary switch.

In yet other more specific scenarios, the first network element and the second network element are configured to become a respective STP root bridge for a respective virtual local area network (VLAN). Additionally, the first network element and the second network element are configured to exchange roles due to a failure of the first network element. In addition, the first network element is configured to designate its own priority level in order to conduct loadbalancing activities in conjunction with the second network element.

Example Embodiments

Figure 1:
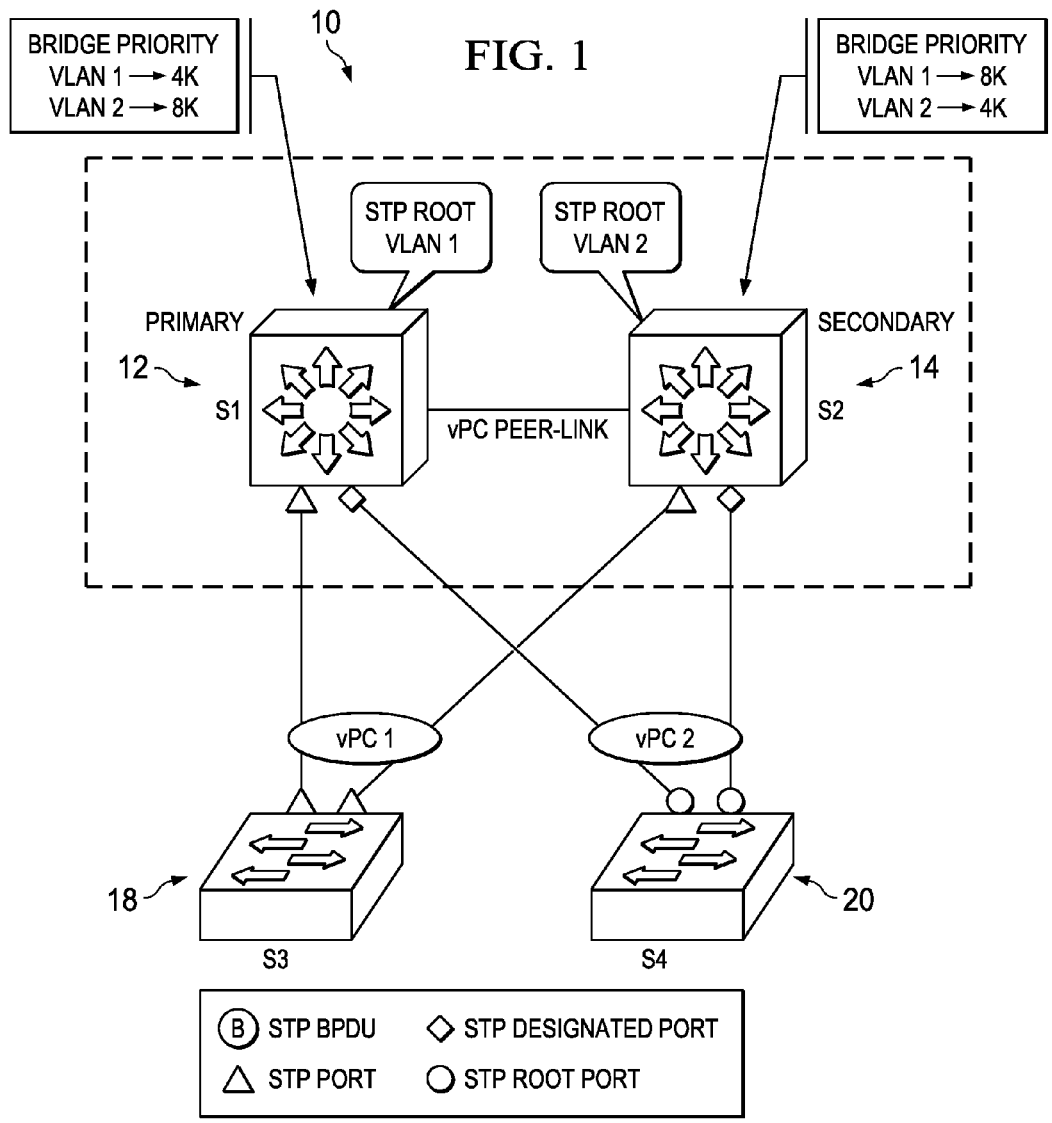
FIG. 1 is a simplified block diagram of a communication system for managing network traffic disruption in a network environment in accordance with one embodiment of the present disclosure.

Turning to FIG. 1, FIG. 1 is a simplified block diagram of a communication system 10 for managing network traffic disruptions in a network environment in accordance with one embodiment. In certain embodiments, the architecture of FIG. 1 can employ a method for extending a Spanning Tree Protocol (STP) to operate in a network deploying network elements (e.g., switches) configured to include Virtual Port-Channels (vPCs). Adding additional functionality to STP may allow for the minimization of network traffic disruptions during a vPC switch failure and during its subsequent recovery.

FIG. 1 may include switches S1 12, S2 14, S3 18, and S4 20 operating in a network environment. Switches S1 12, S2 14, S3 18, and S4 20 may be coupled to each other via various communication links that may be wired or wireless. Further, switches S1 12 and S2 14 may be coupled together by a vPC peer-link that may be wired or wireless. vPC is a port-channel that allows its port-channel member-links to be spread across multiple switches (e.g., two switches S1 12 and S2 14). The two switches may be referred to as vPC peer-switches. As earlier noted, vPC peer-switches may be connected by a link called the vPC peer-link, which may assist with the provisioning of the vPC capability.

A vPC peer-link may be designed to transmit both control plane network traffic, as well as data information traffic (e.g., data packets, frames, etc.) One vPC peer-switch may be elected as the primary and the other as the secondary through an election mechanism. In general, vPC technology allows multiple physical switches to be recognized as a single logical switch by the forwarding protocols of other network switches. The logical representation of switches S1 12 and S2 14 as a single switch is illustrated by the dashed rectangle box that surrounds the switches S1 12 and S2 14.

Note that link state routing is a protocol that allows a node in a network to determine network topology by sharing information about transmission cost to each of its neighboring nodes. Link state routing packets are transmitted to (and received from) neighbors. The least expensive path to various destinations can be determined using the link state information. Link state information can be used to generate network topology information at various network nodes (e.g., used in constructing forwarding tables). The forwarding tables allow network nodes (such as switches and bridges) to forward the received traffic on an appropriate output interface. In order to generate a network topology map and a forwarding table at a specific node, link state information is distributed from various network nodes. Each network node is configured to create a link state packet having information about the distance, delay, or costs to each of its neighbors. A link state record (LSR) can then be transmitted to neighboring nodes.

Classic Ethernet (CE) networks typically use STP as their forwarding protocol. STP commonly runs on a switch and, further, operates to maintain a loop-free topology in a Layer 2 switched network. The term spanning tree protocol (STP) as used herein includes any version of STP, including for example, traditional STP (IEEE 802.1d), rapid spanning tree protocol (RSTP) (IEEE 802.1w), multiple spanning tree protocol (MSTP) (IEEE 802.1s), or any other spanning tree protocol. In one particular example, communication system 10 is representative of a Layer 2 network, which may be executing the STP forwarding protocol. In the illustration of FIG. 1, switches S1 12, S2 14, S3 18, and S4 20 would be executing STP on their respective links.

Returning to FIG. 1, switch S1 12 may be configured to be the STP root for a virtual local area network (VLAN) (e.g., VLAN 1). Hence, the bridge priority of S1 12 can be minimized (e.g., set to approximately 4096, or 4K, as shown in FIG. 1)) for VLAN 1. Switch S2 14 may be configured to be the STP root for a second VLAN (e.g., VLAN 2). The bridge priority of S2 14 can similarly be minimized for VLAN 2. Moreover, STP for vPC peer-switches is controlled by the vPC primary switch (e.g., switch S1 12), while a secondary switch can be in hot standby mode (e.g., switch S2 14). Representing vPC peer-switches within STP as a single logical switch presents new and additional challenges. The failure and subsequent recovery of either of the vPC peer-switches can create conversion issues that may disrupt network traffic (e.g., STP ports on a switch may become blocked until the switch can re-sync with other switches through control plane communications). Further, VLAN loadbalancing can be affected by implementing vPC peer-switch technology. The architecture of FIG. 1 illustrates the initial configuration of various network elements that can be implemented in various switching scenarios, some of which are detailed below with reference to corresponding FIGURES.

Figure 2:
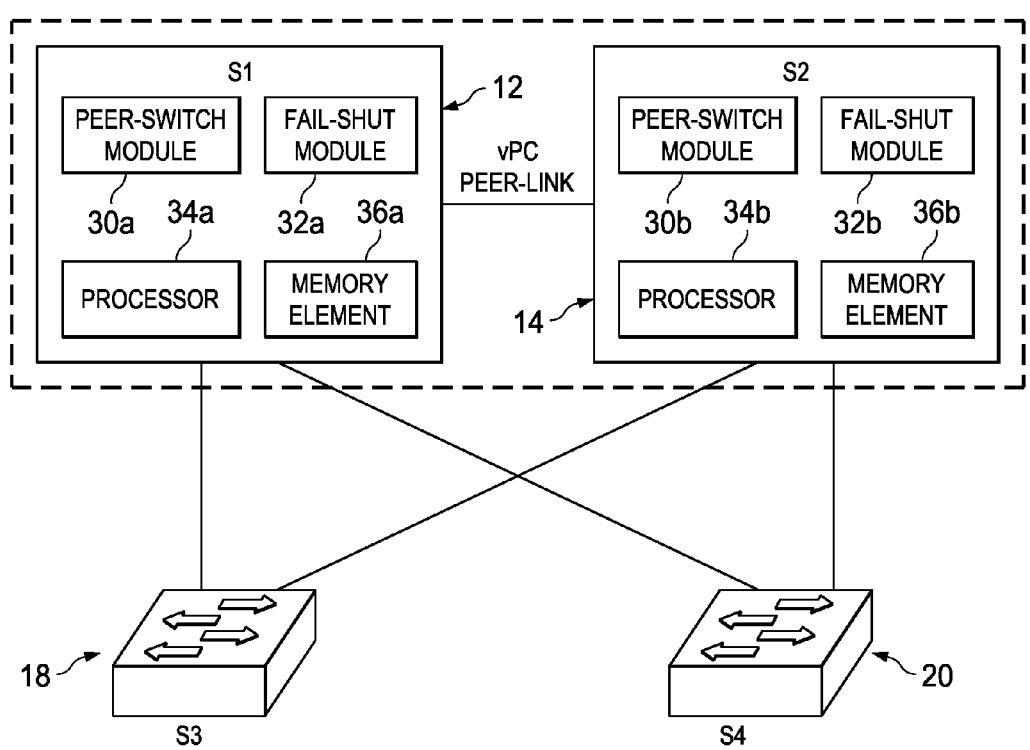
FIG. 2 is a simplified block diagram illustrating additional details related to the communication system in accordance with one embodiment.

Turning to FIG. 2, FIG. 2 is a simplified block diagram illustrating potential details associated with communication system 10. In this particular example, switches S1 12 and S2 14 include a respective peer-switch module 30a-b, a respective fail-shut module 32a-b, a respective processor 34a-b, and a respective memory element 36a-b. Note that although not depicted, switches S3 18, S4 20, S5 24, and S6 26 (S5 24 and S6 26 are illustrated in FIGS. 6A-D) may also be similarly configured to include respective peer-switch modules, fail-shut modules, processors, and memory elements. In operation of one example scenario, the architecture of FIG. 2 can facilitate a vPC functionality.

The vPC functionality allows multiple switches in a network topology to appear as a single switch. Enhancing forwarding protocols (e.g., STP) to manage the vPC functionality within a topology can reduce traffic disruptions. Enhancements may include the introduction of pseudo information into the forwarding protocol that can minimize inconsistent representations of the switches providing the vPC functionality within the network topology. Specifically, enhancements can minimize the need for control plane synchronization requests when a switch providing vPC functionality fails and subsequently recovers. Typically, control plane synchronization requests within a network system are managed by individual network elements in a manner that disrupts the flow of data information (e.g., the network elements close their ports to data traffic until the control plane synchronization it complete).

In operation of one example scenario, the architecture of FIG. 2 reduces the amount of control plane synchronization requests and, thus, minimizes network traffic disruptions. Note that vPC is an 'active-active' distributed control-plane model running STP on both the vPC pair-switches as against the virtual switching system (VSS), which follows a centralized control-plane model. One advantage of a distributed control plane is that it allows a vPC peer-link to be replaced by other technologies such as an L2 Multipath (L2MP) link/fabric. In another operation of one example scenario, the architecture of FIG. 2 effectively eliminates loops created by failure of the vPC peer-link that connects vPC peer-switches.

Operationally, communication system 10 is capable of providing a number of enhancements to a switching architecture. The first enhancement can operate to exclude a vPC peer-link from the STP computations. This could avoid STP Topology Change Notifications (TCNs), when the vPC peer-link flaps, which churns the media access control (MAC) address re-sync across vPC switches. Additionally, in certain vPC topologies, such an enhancement avoids unnecessary RSTP Sync (e.g., RSTP proposal-agreement handshakes) on vPCs when the vPC Secondary Switch is the STP Root Switch, and the vPC peer-link flaps.

As part of a separate enhancement offered by communication system 10, even though the system can execute STP for vPCs on the primary vPC switch, the architecture can also send STP Bridge Protocol Data Units (BPDUs) from both the vPC switches on the designated STP port. This can be performed in order to avoid issues related to BPDU timeouts on the downstream switches that can cause various problems such as STP dispute, loop guard inconsistency (that results in traffic disruption), etc. Additionally, such an enhancement avoids recommendations to increase the STP HELLO time. More specifically, STP for vPCs is controlled by STP running on the vPC primary switch, so only the vPC primary switch sends BPDUs on the STP designated ports. After the vPC secondary switch takes over as the primary switch (vPC role change window), STP on the secondary vPC switch can start sending BPDUs on the vPCs.

In the vPC scalability setups, the vPC role change window (which also includes the hold time to detect the vPC peer switch alive by vPC manager) causes the downstream switches to timeout the BPDU information (e.g., with a default STP HELLO time of two seconds, the default BPDU timeout is six seconds (i.e., three x HELLO interval)). Hence, there would be a recommendation to increase the STP HELLO time. However, this recommendation is a limitation because of the impact of the STP convergence on the hybrid (vPC and non-vPC) topologies. In addition, it is not good practice to change the default STP HELLO time. In order to solve this issue, the architecture of communication system 10 is configured to send the BPDUs from both the vPC switches on the designated ports. However, the BPDU information sent by both the switches should generally be the same; otherwise, this could confuse the downstream switches. Hence, in a particular implementation, the architecture can use the domain based vPC system MAC address as the STP Bridge ID (on both the vPC switches).

Yet another enhancement that can be provided by communication system 10 relates to STP on the vPC primary switch. STP can support a non-disruptive vPC Role Change framework, which allows for an auto-revert of the vPC role to maintain network configuration consistency. STP on the vPC primary switch can control the STP operations on the vPCs, and STP on vPC secondary switch executes in a passive mode for vPCs. This indicates that STP for vPCs is coupled with the vPC role. Hence, to non-disruptively auto-revert the vPC role or to handle the CLI-based vPC role change, the STP and vPC manager can support such a sequence, which is further detailed below.

An additional enhancement of communication system 10 addresses a fail-shut mode support for a vPC peer-link failure and for a dual-active (vPC peer-link and vPC keep-alive link failure) scenario. This can further support a vPC bring-up after port flap. Additionally, this can allow a single vPC switch to bring up the vPC without waiting for vPC peer-link adjacency formation. Such an enhancement can relax the STP bridge assurance, and avoid the STP dispute on the STP root bridge because the port role can be blocked once the vPC peer-link is down. In such scenarios, the vPCs on the secondary switch can remain up. Note that, by default, the vPCs on the secondary switch can be kept down, as it is currently, whenever the vPC peer-link is down. Furthermore, a setting can be provided such that users can decide to keep the vPCs up on the secondary vPC switch.

Another enhancement of communication system 10 is also associated with the STP fail-shut mode. Logistically, after the vPC peer-link failure, STP on vPC switches can enter into a fail-shut mode. For the fail-shut behavior, once the vPC peer-link failure is detected, the current STP topology can be recorded as the last agreed topology for the vPC pair. Additionally, any STP event, either local or external, that changes the last agreed topology and/or that requires vPC to be blocked can adhere to the following rules. First, dispute the peer; if the peer is not capable of dispute, then disable the vPC to avoid a potential loop. Additionally, the vPC-peer loop detection mechanism can provide the fail-safe loop prevention during vPC peer-link failure, or in dual-active scenarios. STP can send out a new type of BPDU (vPC-peer loop detection BPDU) to detect and/or disable any redundant vPC links to avoid potential loops or frame duplications. The new BPDUs can be sent per-VLAN. The new BPDU can use a reserved multicast MAC address, which can be treated as data frames. In addition, the new BPDU can be sent as priority/VLAN tagged with the highest class of service (COS). During link up, the three BPDUs can, for example, be sent every second. Later, BPDUs can be sent less frequently (e.g., every 10 seconds). The new BPDUs can be interlaced with regular BPDUs for better scalability.

Returning to some of the infrastructure of FIG. 2, communication system 10 represents a series of points or nodes of interconnected communication paths for receiving and transmitting packets of information that propagate through the system. This network offers a communicative interface between network elements (e.g., switches, bridges, gateways, etc.) and may be any IP network, local area network (LAN), virtual LAN (VLAN), wireless LAN (WLAN), metropolitan area network (MAN), wide area network (WAN), extranet, Intranet, virtual private network (VPN), or any other appropriate architecture or system that facilitates communications in a network environment. The network can support a transmission control protocol (TCP)/IP, or a user datagram protocol (UDP)/IP in particular embodiments of the present disclosure; however, this network may alternatively implement any other suitable communication protocol for transmitting and receiving data packets within communication system 10.

Switches S1 12, S2 14, S3 18 and S4 20 are network elements that route (or that cooperate with each other in order to route) traffic and/or packets in a network environment. As used herein in this Specification, the term 'network element' is used interchangeably with the terms 'switch' and 'node', and these terms are meant to encompass gateways, switches, routers, bridges, loadbalancers, firewalls, network appliances, inline service nodes, proxies, servers, processors, modules, or any other suitable device, component, element, or object operable to exchange information in a network environment. The network elements may include any suitable hardware, software, components, modules, interfaces, or objects that facilitate the operations thereof. This may be inclusive of appropriate algorithms and communication protocols that allow for the effective exchange (reception and/or transmission) of data or information.

In operation, peer-switch modules 30a-b may be configured to manage network traffic disruptions in communication system 10. Peer-switch modules 30a-b can establish a vPC peer-switch formation between switch S1 12 and S2 14. Further, peer-switch modules 30a-b may enhance STP executing on vPC peer-switches to minimize traffic disruptions. Enhancing STP may include introducing pseudo information that allows vPC peer-switches to modify their respective STP root priorities and STP designated priorities. Moreover, peer-switch modules 30a-b can manage the failure and subsequent recovery of a vPC peer-switch in a manner that minimizes network traffic disruptions. Fail-shut modules 32a-b may be configured to recognize the failure of a vPC peer-link. Fail-shut modules 32a-b may coordinate removing the operation of vPCs when vPC peer-switches are in a dual active mode (e.g., the vPC peer-switches both believe they are the operational primary switch). Processors 34a-b may execute code stored in memory elements 36a-b and/or assist in any of the switching activities discussed herein.

Note that switches S1 12, S2 14, S3 18, and S4 20 may share (or coordinate) certain processing operations. Using a similar rationale, their respective memory elements may store, maintain, and/or update data in any number of possible manners. In a general sense, the arrangement depicted in FIG. 2 may be more logical in its representations, whereas a physical architecture may include various permutations/combinations/hybrids of these elements. In one example implementation, switches S1 12, S2 14, S3 18 and S4 20 include software (e.g., as part of peer-switch modules 30a-b and fail-shut modules 32a-b) to achieve the network traffic disruption management, as outlined herein in this document. In other embodiments, this feature may be provided externally to any of the aforementioned elements, or included in some other network element (or in a proprietary element) to achieve this intended functionality. Alternatively, several elements may include software (or reciprocating software) that can coordinate in order to achieve the operations, as outlined herein.

Figure 3A:
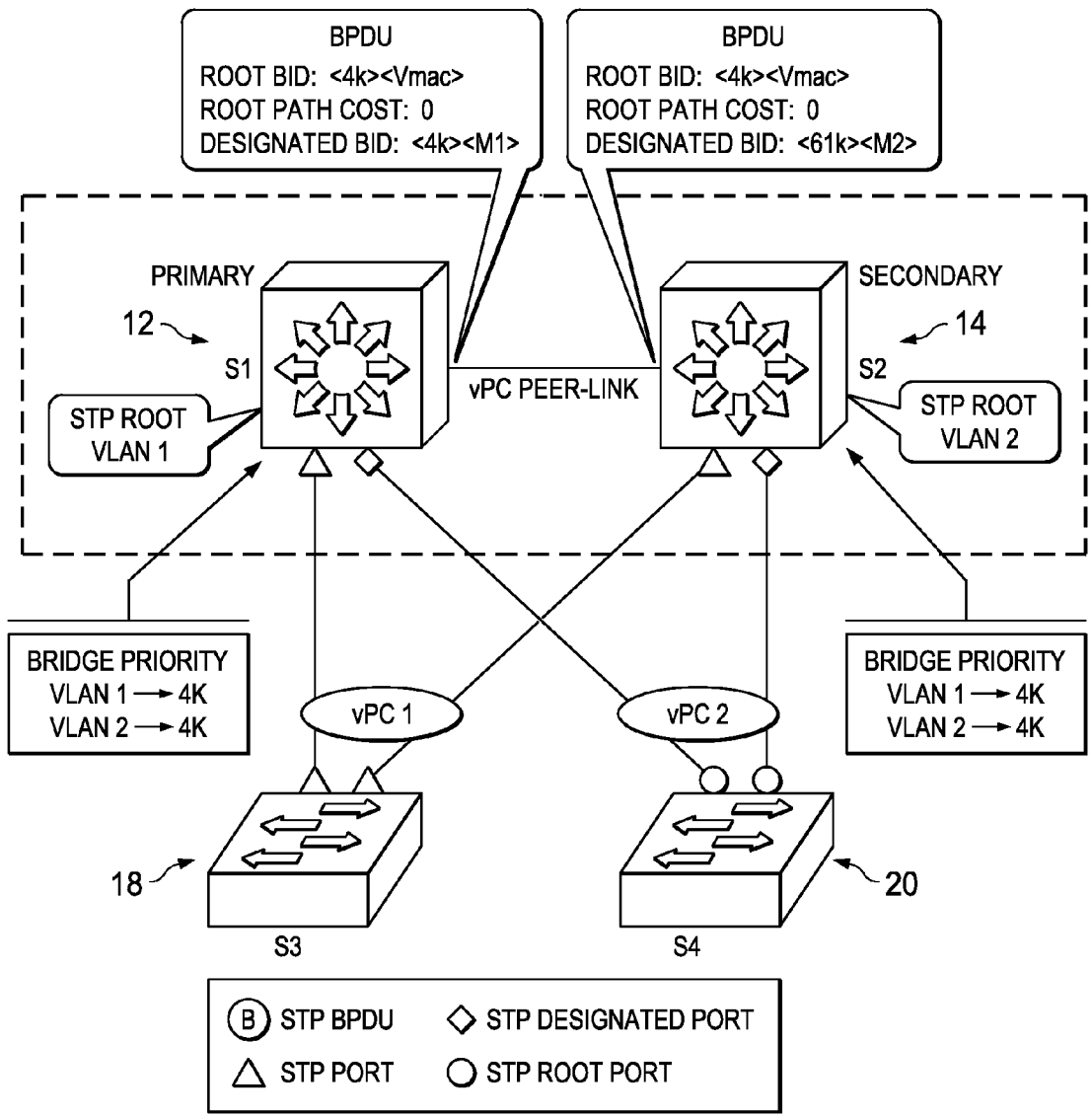
FIGS. 3A-C are simplified block diagrams illustrating details related to example implementations of the communication system in accordance with one embodiment.
Figure 3B:
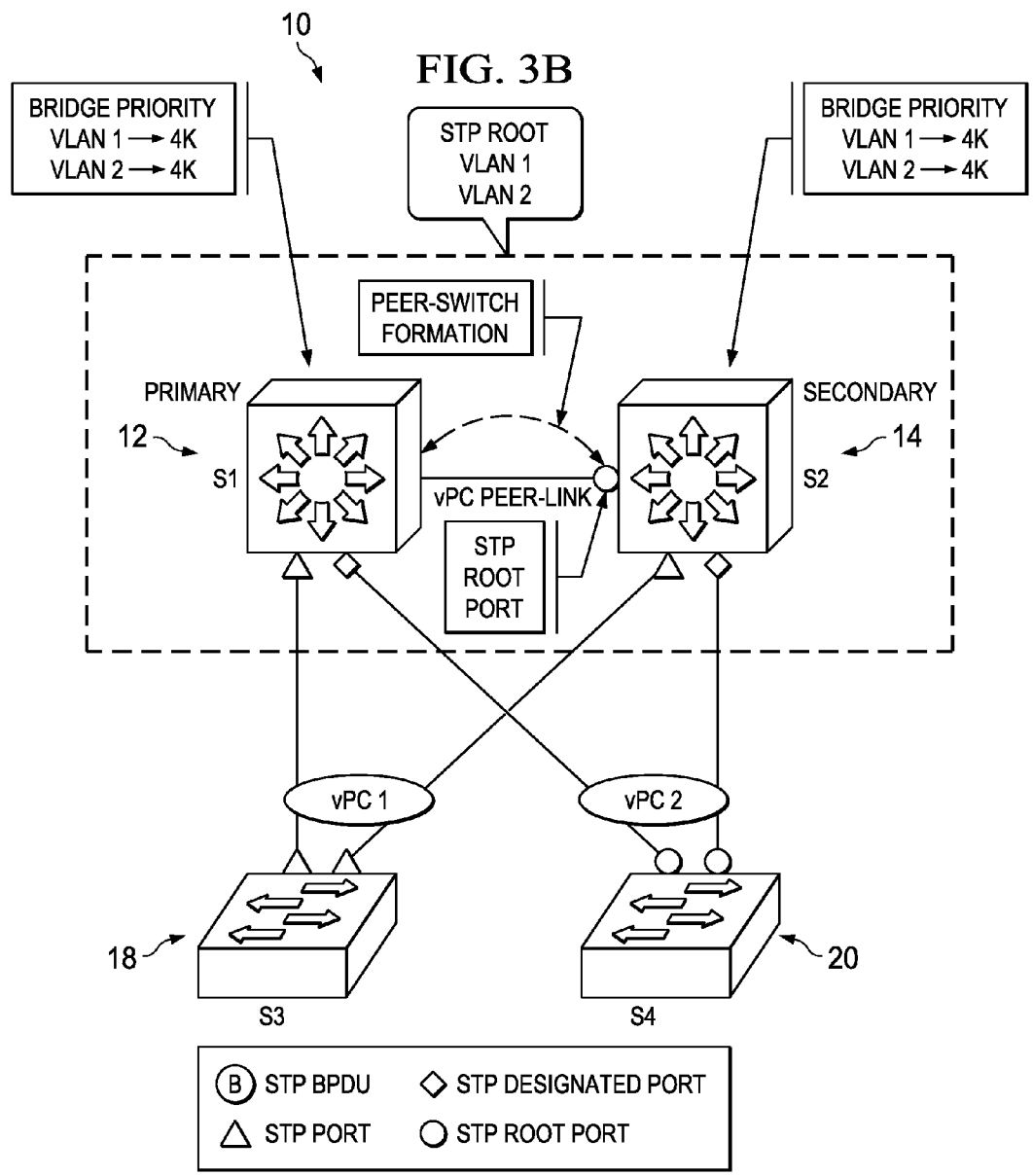
Figure 3C:
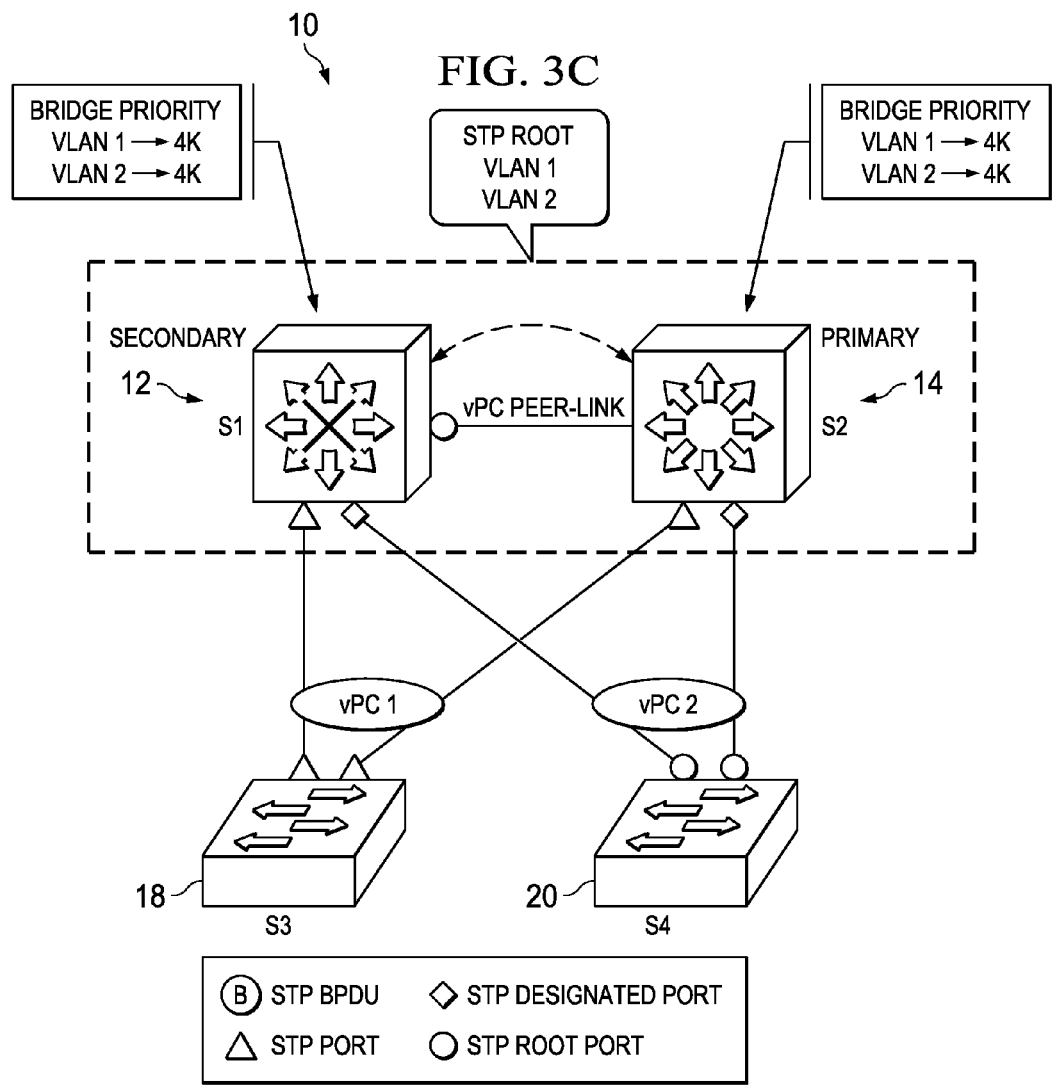

Turning to FIGS. 3A-C, these FIGURES illustrate example network traffic disruption management activities associated with communication system 10. FIGS. 3A-C reflect example configurations for particular network traffic disruption management and, therefore, these related illustrations are discussed together. FIG. 3A illustrates a system of establishing a vPC peer-switch configuration that minimizes network traffic disruptions. Establishing a vPC peer-switch configuration allows switches to appear as a single pseudo switch in the STP topology. vPC peer-switches maintain dual active control planes; hence, STP executes on both switches.

The vPC peer-switch elected as operational primary manages the STP topology for the vPC ports. Hence, the primary switch processes, generates, and transmits STP BPDUs on behalf of the vPC peer-switches. STP on the vPC peer-switch elected as operational secondary still administers STP; however, it does not control the vPC port states. The vPC secondary switch forwards any received BPDU frames to the primary switch. However, the secondary switch does not generate BPDUs for the vPC ports. Each vPC peer-switch may still have its own priority. Moreover, the primary switch can be an STP root or STP secondary root for a VLAN. Similarly, the secondary switch can be the STP root, or STP secondary root for a VLAN. If a vPC secondary switch is an STP root for a VLAN, the primary switch generates STP BPDUs on behalf of the secondary switch. Although, managed by the vPC primary switch, the BPDU indicates that the secondary switch is the STP root.

To enhance STP to accommodate the vPC peer-switch configuration, STP may use a common vPC system Media Access Control (VMAC) address as the STP Bridge MAC address for the vPC peer-switches. The vPC MAC address is negotiated by the vPC peer-switches during peer formation. Thus, BPDUs transmitted by the vPC peer-switches may provide the same MAC address, representing a single switch. Additionally, it is recommended that a vPC primary switch be configured to be an STP root, while a vPC secondary switch is configured to be an STP secondary root. This suggested configuration helps alleviate issues associated with the failure and reloading of the vPC primary switch. Thus, the vPC secondary switch can become the vPC primary switch, and manage STP running on the vPC peer-switches (e.g., should the vPC primary switch fail).

Returning to FIG. 3A, switch S1 12 and switch S2 14 may be configured to provide vPC peer-switch functionality. Switch S1 12 and switch S2 14 may be connected by a vPC peer-link, operational to carry control plane information (e.g., BPDUs), as well as, data information (e.g., data packets and frames). The STP bridge priority of S1 12 may be set to 4096 for VLAN 1 and VLAN 2 in a particular implementation. Similarly, the STP bridge priority of S2 14 may be set to 4096 for VLAN 1 and VLAN 2. Thus, switches S1 12 and S2 14 become the STP roots for switches S3 18 and S4 20. Further, by configuring switches S1 12 and S2 14 with the same STP bridge priority, they may be configured to have the same bridge ID (BID), which is made up of the bridge priority and the negotiated VMAC address. Thus, switches S1 12 and S2 14 can appear as a single switch to neighboring switches (e.g., switches S3 18 and S4 20).

Switches S1 12 and S2 14 each may transmit a BPDU (to the other) through the vPC peer-link. Data information contained in the BPDU sent from switch S1 12 to S2 14 may contain a root BID that includes 4096 for the bridge priority and the negotiated VMAC value. Also included in the BPDU could be a root path cost value of zero and a designated BID that includes a bridge priority of 4096 and the local MAC address of switch S1 12. The BPDU sent from switch S2 14 to switch S1 12 may include a root BID containing a bridge priority of 4096 and the negotiated VMAC value. The BPDU may also include a root path cost value of zero and a designated BID that contains a bridge priority of 61440 and the local MAC address of switch S2 14. When vPC peer-switches S1 12 and S2 14 have the same STP root BID and the root path cost is each zero, the vPC peer-switch functionality may be available. Moreover, because S1 12 has a designated BID that is lower than S2 14, it will be initially elected as the vPC operational primary switch, and S2 14 will become the vPC operational secondary switch.

Progressing to FIG. 3B, the vPC peer-switch formation is further illustrated. The vPC peer-switches may become the STP root bridge for VLAN 1 and VLAN 2. In order to manage network traffic disruptions, the vPC peer-link is configured such that the vPC primary switch (i.e., S1 12) connected to the vPC peer-link is an STP designated port and the vPC secondary switch (i.e., S2 14) connected to the vPC peer-link is an STP root port. This formation can be managed by forcing the designated bridge priority of the vPC primary switch to be lower than the vPC secondary switch (e.g., the designated priority of S1 12 may be 4096, and the designated priority of S2 14 may be 61440).

Thus, as illustrated in FIG. 3C, should the roles of the vPC peer-switches change due to the failure and subsequent recovery of one of the vPC peer-switches, network traffic disruption may be minimized. As shown by the 'X', vPC primary switch S1 12 may fail. In such a scenario, vPC secondary switch S2 14 may become the vPC operational primary switch, thus taking over the management of STP responsibilities for the vPCs of the vPC peer-switches. Unless appropriately managed, when switch S1 12 recovers from the failure, it may attempt to become the STP root for neighboring switches, and return to the role of vPC primary switch, even though S2 14 has assumed that responsibility. The inconsistent understanding of roles can lead to a rapid spanning tree protocol (RSTP) synchronization request between S1 12 and S2 14 to negotiate the appropriate vPC peer-switch formation. During an RSTP synchronization request, S1 12 and S2 14 may put their STP designated ports on the vPC into a blocked state. Thus, traffic flowing through the vPC peer-switches maybe ceased and disrupted until an agreement between the vPC peer-switches is reached. The negotiation and agreement period can take upwards of two to three seconds, which can be a significant disruption to network traffic.

As noted above, by forcing the designated bridge priority of the vPC primary switch to be lower than the vPC secondary switch, the disruption can be avoided. Therefore, when vPC peer-switch S2 14 assumes the role of vPC primary switch, the port attached to the vPC peer-link becomes the STP root port. As the vPC primary switch, S2 14 transmits BPDUs to S1 12 that include an STP designated BID containing a bridge priority of 4096 (i.e., a value lower than the bridge priority contained in the designated BID sent by S1 12). Further, the port on vPC peer-switch S1 12 connected to the vPC peer-link becomes an STP designated port. When S1 12 recovers from its failure, it can recognize that S2 14 has assumed the role of vPC primary switch because S2 14 is now the STP root for S1 12. S1 12 may transmit BPDUs with the designated BID containing a bridge priority of 61440 (e.g., lower than the equivalent bridge priority value in the BPD sent by S2 14). Thus, S1 12 can reload to become the vPC secondary switch and no convergence issues arise. Network traffic disruptions created by the failure can be effectively avoided.

Figure 4:
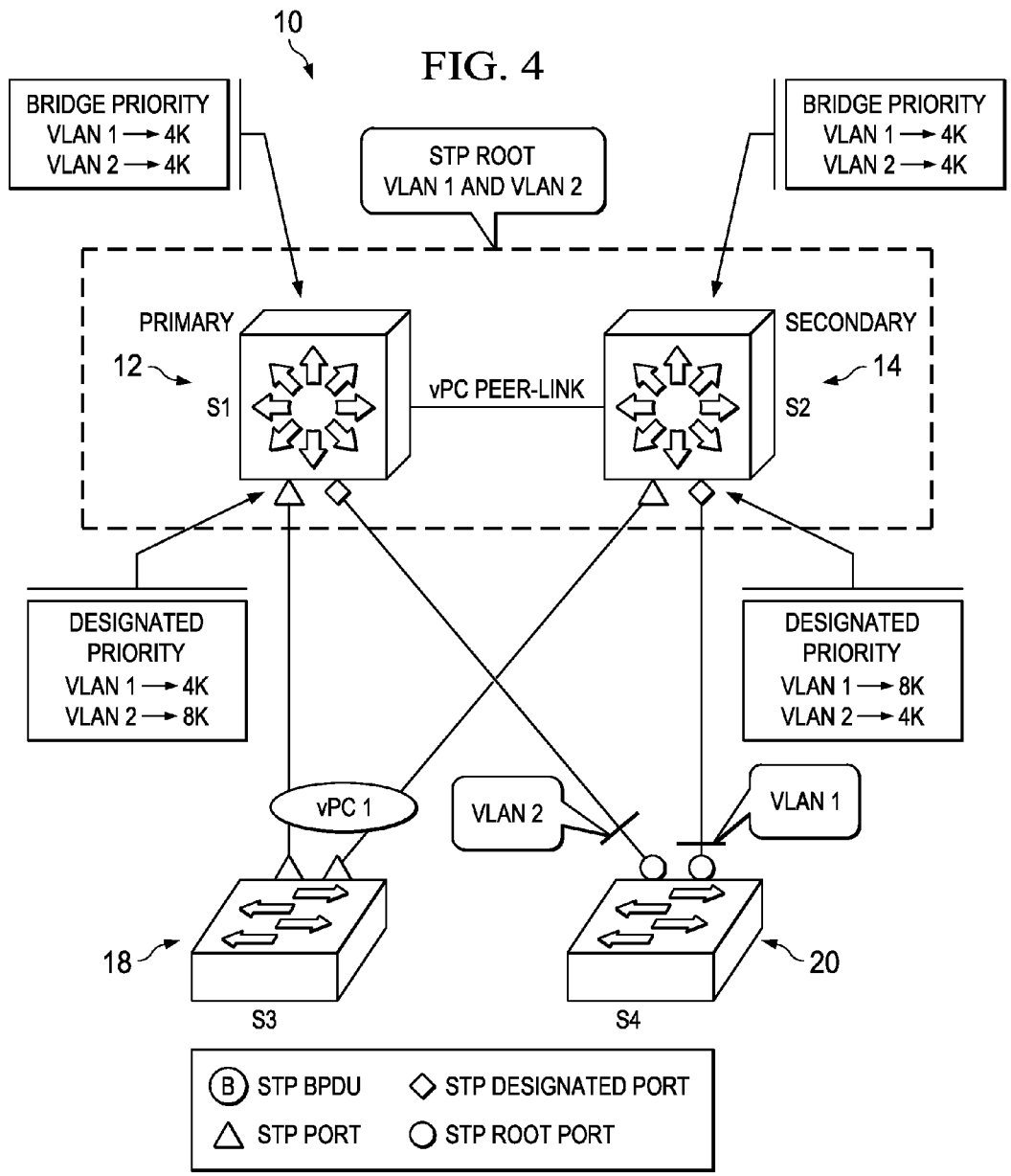
FIG. 4 is a simplified block diagram illustrating additional details related to example implementations of the communication system in accordance with one embodiment.

FIG. 4 illustrates additional design details to manage network traffic disruptions in communication system 10 in accordance with one embodiment. Additional network traffic disruption can be created when vPC peer-switches are connected to neighboring switches that are linked through regular port channels (e.g., non-vPCs). Thus, a hybrid network topology may be created that appropriately manages forwarding activities with switches executing non-vPC enhanced STP (e.g., regular STP) and switches executing vPC enhanced STP. As noted above, setting the bridge priority of switches S1 12 and S2 14 to be the same value (e.g., 4096) assists with establishing the vPC peer-switch formation. Unfortunately, modifying the bridge priority on a vPC peer-switch may lead to a traffic disruption on neighbor switches executing non-vPC configured STP. As shown in FIG. 4, switch S4 20 is connected to switches S1 12 and S2 14, and executes regular STP (e.g., switch S4 20 is not connected through a vPC). Stated in different terms, when switch S4 20 receives a BPDU from S1 12 or S2 14 indicating that their respective bridge priorities for VLAN 1 or VLAN 2 have changed, switch S4 20, executing non-vPC enhanced STP, may make an RSTP synchronization request. As noted above, an RSTP request will block switch ports until the STP topology can be reestablished (and possibly updated). Further, by the vPC peer-switches having the same bridge priority (e.g., appearing in the STP topology as a single switch), VLAN based loadbalancing by STP redundant links connected to switch S4 20 may not be performed.

Allowing the vPC peer-switches S1 12 and S2 14 to configure their respective STP designated priorities (e.g., create STP pseudo information) can alleviate network traffic disruptions and allow for VLAN loadbalancing. As illustrated in FIG. 4, switch S1 12 may configure its STP designated priority to 4096 and 8192 for VLAN 1 and VLAN2, respectively. Switch S2 14 may configure its STP designated priority to 8192 and 4096 for VLAN 1 and VLAN 2, respectively. Thus, switch S1 12 can remain the STP root for VLAN 1, and switch S2 14 can remain the STP root for VLAN 2. Further, the STP designated priorities for switches S1 12 and S2 14 can provide VLAN based loadbalancing capabilities. Therefore, if S1 12 and S2 14 change their bridge priorities to 4096 for VLAN 1 and VLAN 2, as part of enabling the vPC peer-link formation, switch S4 20 (e.g., a switch executing regular STP) may receive BPDUs containing the designated bridge priorities. The BPDUs include information showing the same priorities as before the peer-link formation was established (e.g., the STP designated priorities are equivalent to the initial STP bridge priorities illustrated in FIG. 1). Thus, switches executing regular STP may not make an RSTP synchronization request, which would create a network traffic disruption as noted above. An alternative design for handling VLAN loadbalancing can be implemented using STP port costs; however, using the pseudo designated priority information simplifies the loadbalancing tasks.

Figure 5:
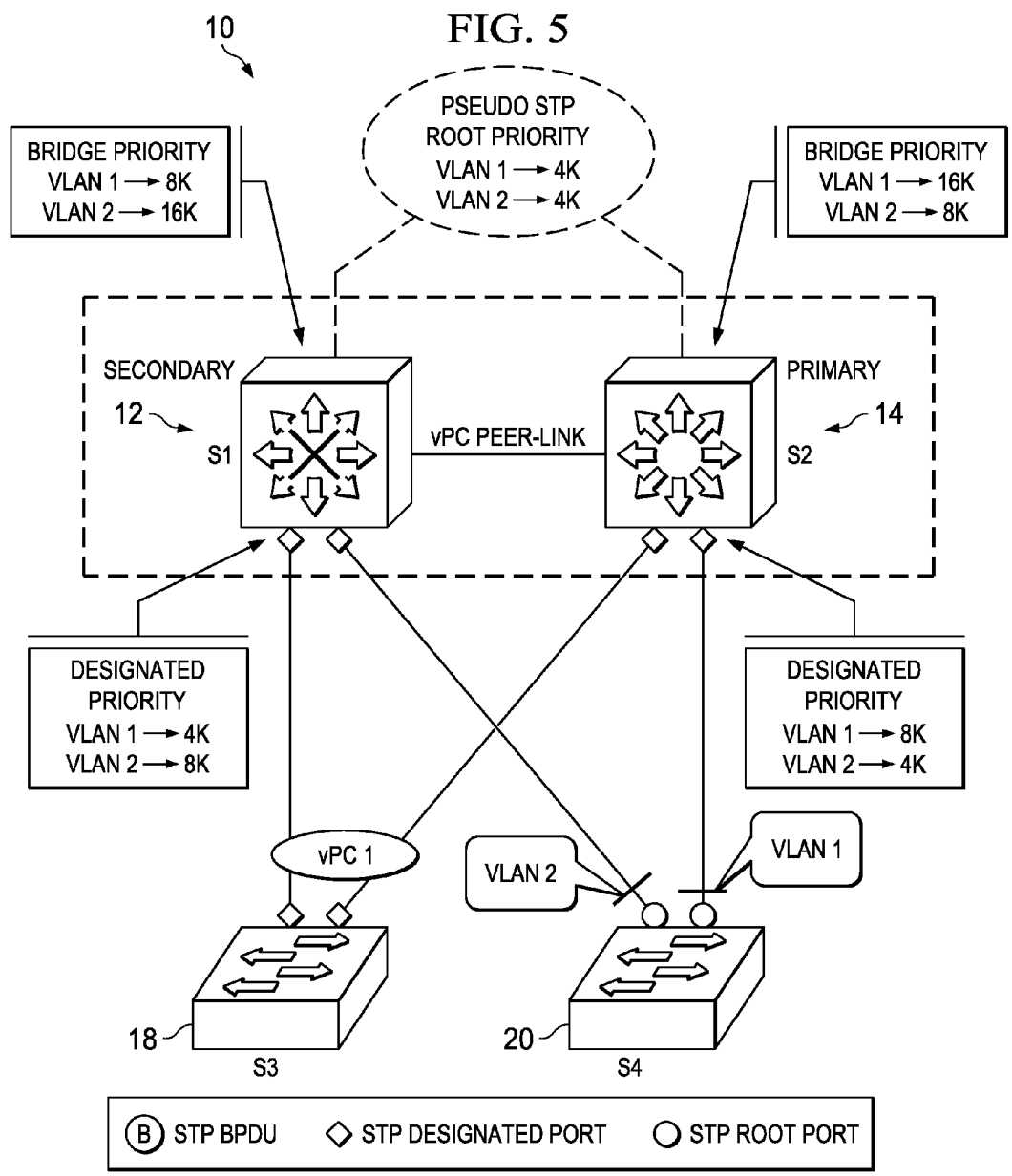
FIG. 5 is a simplified block diagram illustrating additional details related to example implementations of the communication system in accordance with one embodiment.

FIG. 5 illustrates additional details associated with managing network traffic disruptions in communication system 10. Network traffic disruption can increase when the vPC primary switch fails and attempts to recover. Former vPC primary switch S1 12 is illustrated as failing. Former vPC secondary switch S2 14 has become the vPC primary switch, and assumed the role of coordinating STP on the vPCs of the vPC peer-switches. When S1 12 recovers from the failure, it may cause a traffic disruption if it tries to assume its former role as the STP root for switch S4 20 (e.g., a switch executing regular STP). Typically, non-vPC ports are operational before the vPC ports are formed. Hence, S1 12 may attempt to send out BPDUs before the peer-link formation has been created. The BPDU sent by S1 12 may include a bridge priority that is the same as the bridge priority, as S2 14 transmits on behalf of the vPC peer-switches. Further, the BPDU sent by S1 12 may additionally contain the local MAC address of S1 12, while the BPDU sent by S2 14 on behalf of the vPC peer-switches may include the VMAC address. If the local MAC address of S1 12 is lower (i.e., better) than the VMAC address transmitted by S2 14, then switch S4 20 may make an RSTP synchronization request in an attempt to change S1 12 to its STP root.

Using the additional pseudo STP information can alleviate the disruption created by the failure and subsequent recovery of switch S1 12. A pseudo STP root priority for the vPC peer-switches may be set to 4096. The bridge priority of vPC peer-switches S1 12 and S2 14 may be set to a value greater (e.g., worse) than the pseudo STP root priority (e.g., 8192, 16384, etc.). Thus, if switch S1 12 fails and, upon its recovery, its regular port channels (e.g., its non-vPCs) are operational prior to the vPC peer-switch formation. Further, it may transmit a BPDU to switch S4 20 containing a bridge priority that is higher than the bridge priority transmitted in a BPDU by switch S2 14 to switch S4 20. Therefore, the bridge priority of the recovering switch S1 12 can be worse (e.g., greater) than the root bridge priority transmitted by switch S2 14 on its vPCs. In such a case, switch S2 14 will remain the STP root for switch S4 20, and switch S4 20 may not make an RSTP synchronization request that will disrupt network traffic flow.

Figure 6A:
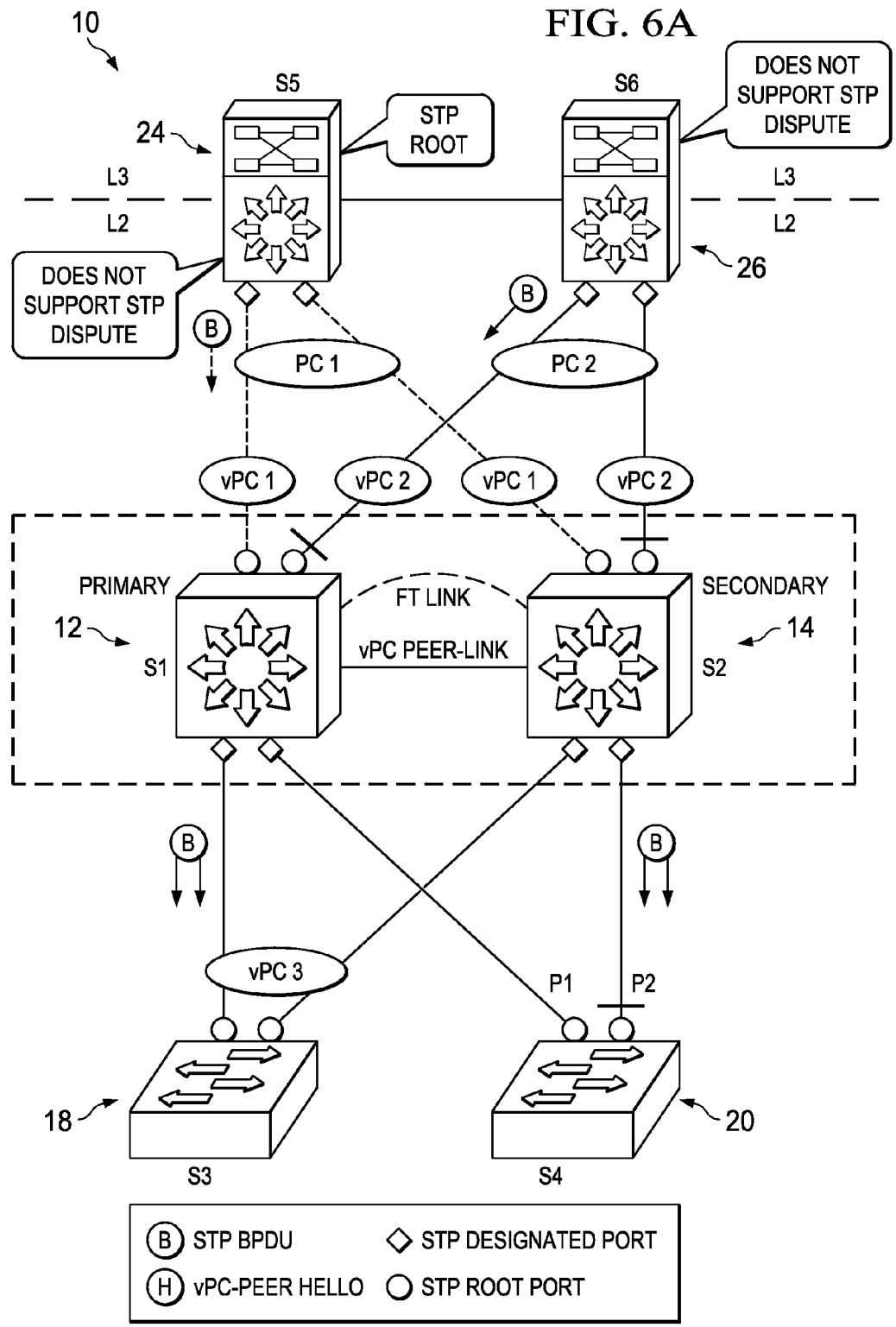
FIGS. 6A-D are simplified block diagrams of a communication system for providing certain switching activities in a network environment in accordance with one embodiment of the present disclosure.

Turning to FIGS. 6A-D, these FIGURES illustrate further network disruption management activities associated with communication system 10. FIGS. 6A-D reflect example configurations for preventing loops within communication system 10 as a result of the failure or unavailability of a vPC peer-link and, therefore, these related illustrations are discussed together. FIG. 6A illustrates a system of establishing a vPC-peer-switch configuration that minimizes network traffic disruptions and that prevents loops. In one example embodiment, switches S1 12 and S2 14 are configured as vPC peer-switches. vPC peer-switch S1 12 may be the operational primary switch and vPC peer-switch S2 14 may be the operational secondary switch. vPC peer-switch S1 12 may be linked to core Layer 2 switches S5 24 and S6 26 through vPCs (e.g., vPC 1 and vPC 2, respectively). Similarly, vPC peer-switch S2 14 can be linked to core Layer 2 switches S5 24 and S6 26 through vPCs (e.g., vPC 1 and vPC 2, respectively). Core Layer 2 switches S5 24 and S6 26 may be linked together. Further, switch S5 24 may be configured to be the STP root. As vPC peer-switch S1 12 is elected as operational primary, it can manage the execution of STP on the vPCs on behalf of the vPC peer-switches. As switch S5 24 is the STP root, vPC peer-switch S1 12 may choose vPC 1 as the uplink to switch S5 24. vPC 2 can be the alternate STP root; hence, it may be blocked. Further, as S1 12 is the elected primary vPC peer-switch, BPDUs from switches S5 24 and S6 26 will be transmitted to it.

Figure 6B:
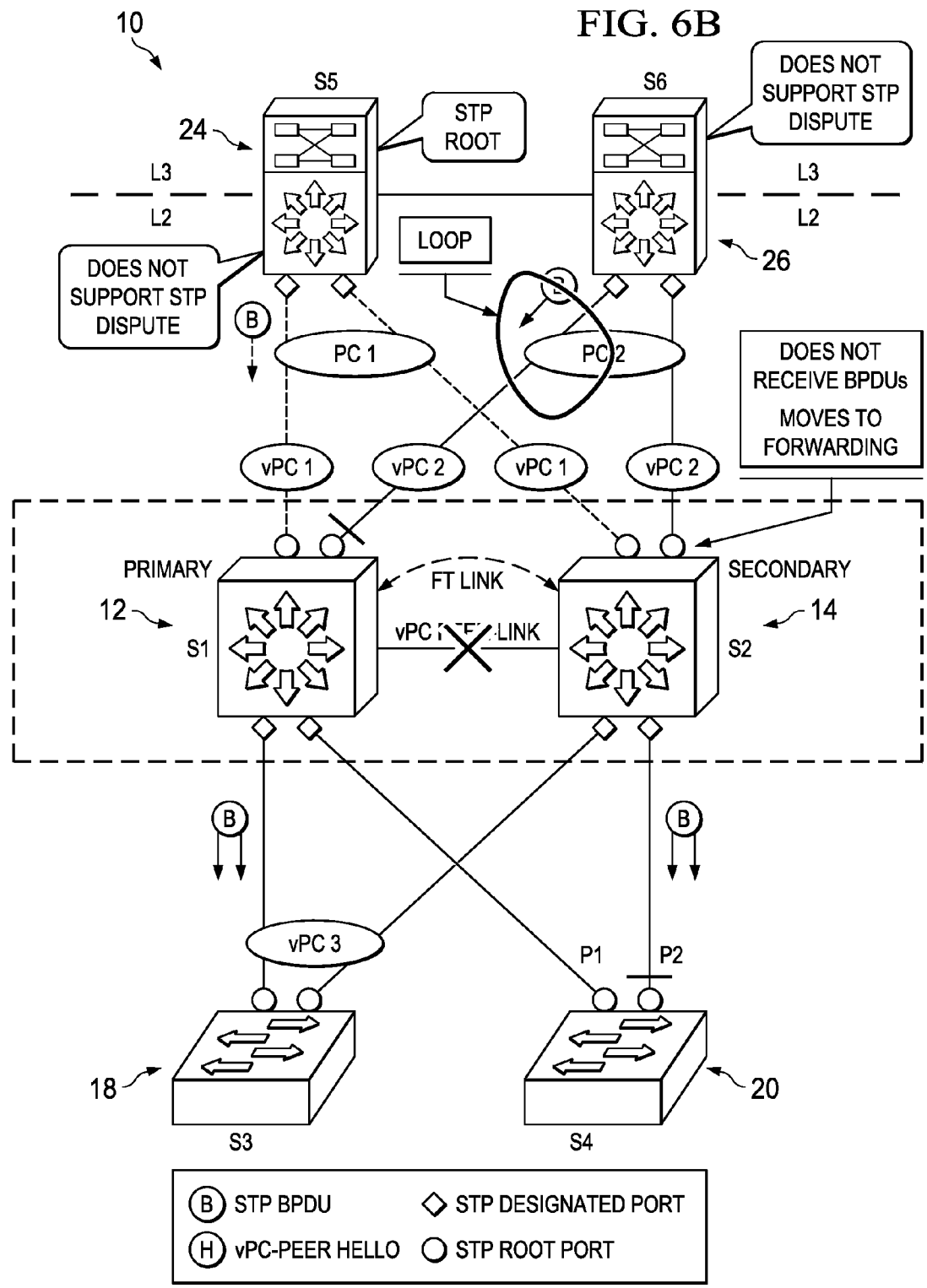

As illustrated in FIG. 6B, if the vPC peer-link fails, vPC peer-switches S1 12 and S2 14 may not be able to communicate vPC peer-link control plane information. Pursuant to some current implementations, upon losing vPC peer-link connection with switch S1 12, switch S2 14 may attempt to assume the role of the vPC primary switch. Hence, switch S2 14 may attempt to execute STP for vPC 1 and vPC 2. Thus, switch S2 14, may unblock its port for vPC 2 to become forwarding, and the vPC peer-switches may then enter into a dual-active or split brain scenario. While in dual-active mode, both vPC peer-switches S1 12 and S2 14 may both execute STP on vPCs. However, since the vPC peer-switches appear in the topology as a single logical switch, only one of the switches may receive BPDUs (e.g., switch S1 12). Therefore, BPDUs being transmitted by switches S5 24 and S6 26 may hash to vPC peer-switch S1 12. As illustrated by the semi-circular arrow in FIG. 6B, the dual-active environment can lead to STP loops since vPC peer-switch S2 14 does not receive BPDUs (e.g., S2 14 fail-opens the vPC 2 port).

Consider an example topology change during a vPC switch in dual-active mode. In a first step, a vPC peer-link and keep-alive link failure occurs between vPC pair switches S1 12 and S2 14, where S1 12 and S2 14 operates in an STP fail-shut mode. In this particular example, a wrong cable triggers an STP topology change as a result of some member-link failure on S5 24. Therefore, a particular link can be selected as the uplink (root) port by S5 14. S5 14 can block the port-channel connecting to vPC 2, and then move the corresponding port to forwarding. S5 14 can then send out superior BPDUs toward S1 12, which is operating in fail-shut mode. S1 12 can detect the topology change, and block the vPC 2. As a fail-shut rule, it can dispute S5 24. If S5 24 is capable of an STP dispute mechanism, then S2 14 can continue disputing S5 24 (otherwise, it can disable its vPC 2 leg). This would make the BPDUs from S5 24 to be received by S2 14, which would do the same. This can prevent the STP loop.

In order to support the vPC flap after the vPC peer-link is down (or is single vPC switch reload after both the vPC switches crash), the architecture can eliminate any redundant uplink vPC links (which is an uncommon deployment) to avoid potential loops or frame duplications. The vPC peer loop detection mechanism, which can be part of the fail-shut mode, achieves this by sending a simple vPC-peer HELLO frame per-VLAN. The HELLO frames can have the same format as Shared Spanning Tree Protocol (SSTP) BPDUs, except that the destination MAC address can be a new reserved multicast MAC address.

Consider another example associated with a vPC flap after vPC peer-link failure. In such a scenario, the vPC pair switches S1 12 and S2 14 enter into a dual-active mode and, hence, operate in an STP fail-shut mode. Operating in a fail-shut mode, S1 12 and S2 14 can send vPC-peer HELLO frames per-VLAN on the vPCs. HELLO messages sent on a particular vPC can be received by another vPC on S1 12 and, assuming that the HELLOs from the sending vPC are superior, the receiving vPC can be disabled on S1 12. At this juncture, the HELLO from the sending vPC will be received by receiving vPC on S2 14, and it also disables the receiving vPC (assuming that the sending vPC has better STP priority than the receiving vPC). The final topology would reflect suitable pruning at the receiving vPC.

Figure 6C:
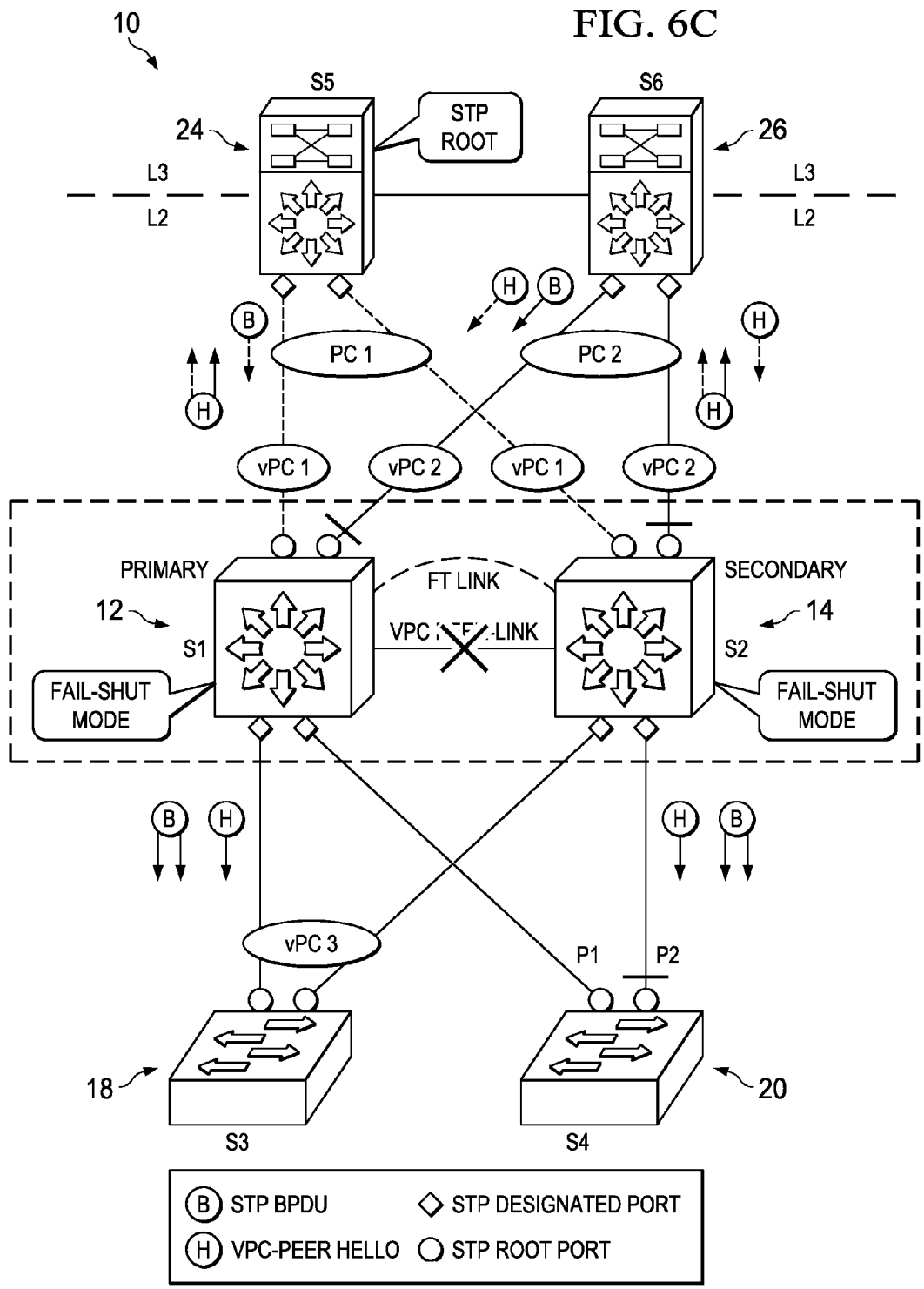

FIG. 6C illustrates one example embodiment to manage the dual-active scenario for vPC peer-switches, thus preventing STP loops and minimizing network traffic disruptions. When a vPC peer-switch detects a possible failure of the vPC peer-link, it may send out a STP vPC HELLO BPDU on the vPCs in order to detect potential loops in the topology. STP vPC HELLO BPDUs may be interlaced amongst other BPDUs being transmitted within the network. Further, the STP vPC HELLOs can be data frames (i.e., they are transmitted and hashed by network elements similar to data information hashing). Therefore, when vPC peer-switches S1 12 and S2 14 detect a potential failure of the vPC peer-link, each may send out STP vPC HELLOs on vPC 1 and vPC 2. Switches S5 24 and S6 26 will hash and forward the STP vPC HELLOs. If S1 12 receives an STP vPC HELLO transmitted from a port attached to vPC 1 at a port attached to vPC 2, it would know that there is a potential for loops (e.g., the STP vPC HELLO likely traveled from switch S1 12 to switch S5 24 on vPC 1, to switch S6 26, and back to switch S1 12 on vPC 2). Once an STP vPC HELLO is received on a different vPC than it was transmitted, the vPC peer-switches may disable one of the vPCs, thus preventing the loop. The vPC with the higher number (e.g., vPC 2) may be disabled. Likewise, if vPC switch S2 14 receives an STP vPC HELLO BPDU at a vPC port that is different than the vPC port that the BPDU was transmitted from, it may similarly disable one of the vPCs.

Figure 6D:
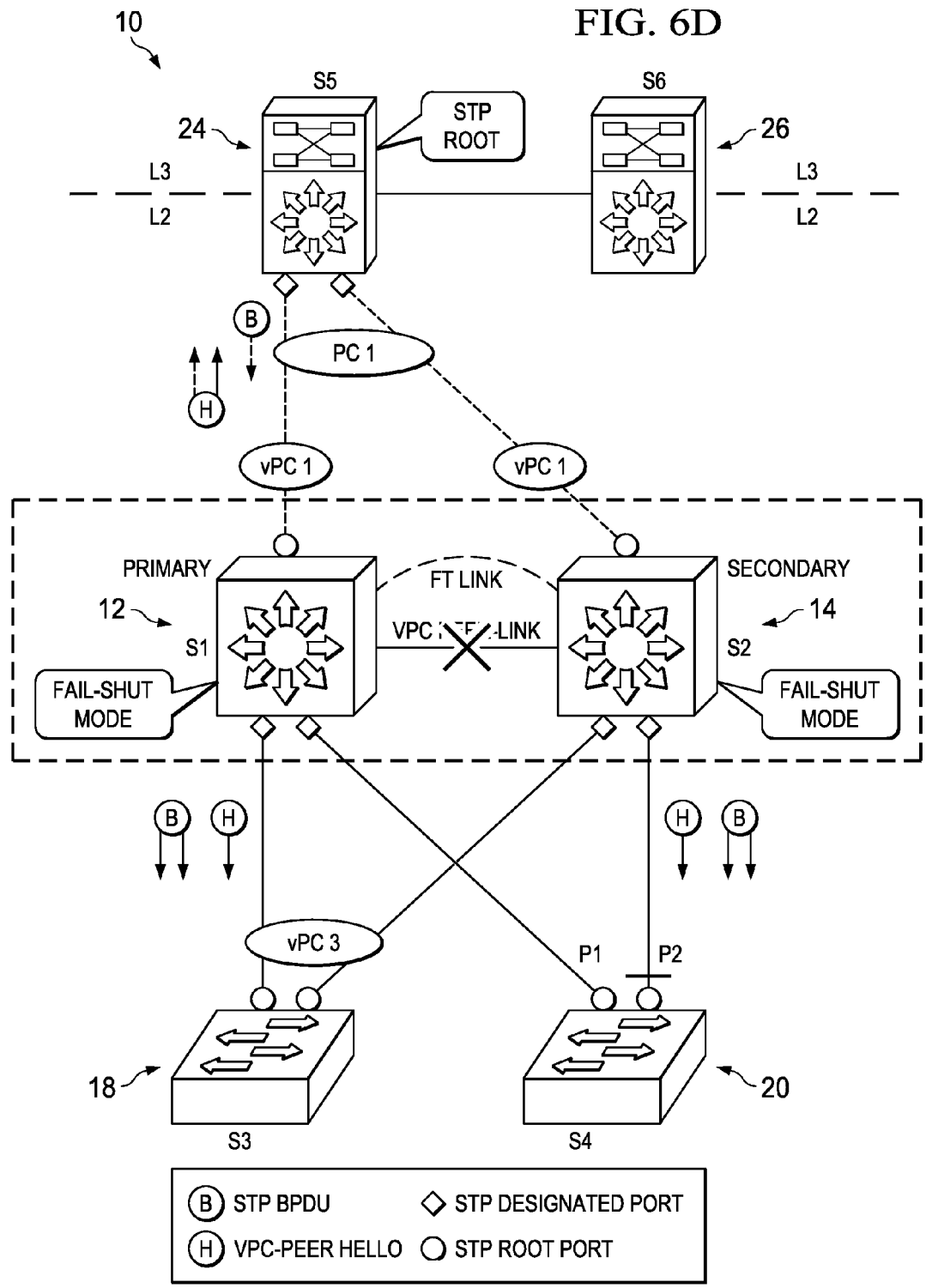

As illustrated in FIG. 6C, vPC peer-switches S1 12 and S2 14 detect the vPC peer-link failure and transmit STP vPC HELLO BPDUs out vPC 1 and vPC 2. Subsequently, switch S1 12 receives (at a port attached to vPC 2) an STP vPC HELLO it transmitted from a port attached to vPC 1. As illustrated in FIG. 6D, switch S1 12 disables the vPC 2 connection to switch S6 26 to prevent loops. Returning to FIG. 6C, switch S2 14 receives (at a port connected to vPC 2) an STP vPC HELLO BPDU that it transmitted on vPC 1. As illustrated in FIG. 6D, switch S2 14 similarly disables the vPC 2 connection to switch S6 26. Thus, by disabling redundant links, the topology can be managed to prevent loops from forming when the vPC peer-link fails or becomes unavailable. Managing dual-active environments not only prevents loops, but also minimizes traffic disruptions.

Figure 7:
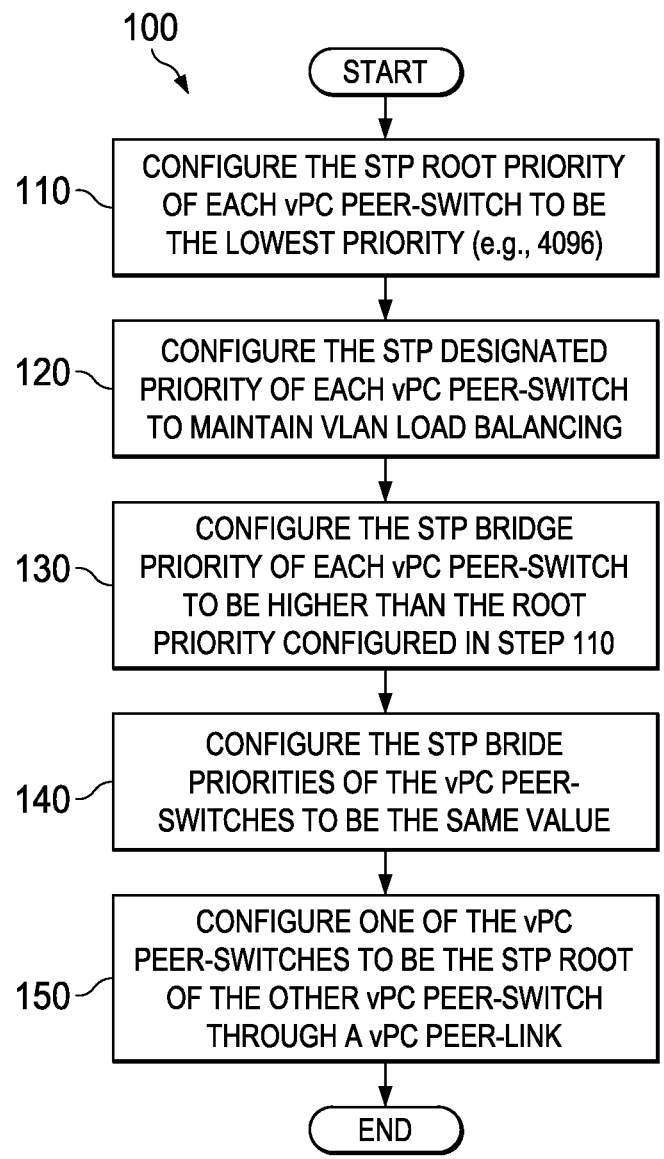
FIG. 7 is a simplified flowchart illustrating example operations for a flow associated with the communication system.

Turning to FIG. 7, FIG. 7 is a simplified flowchart 100 illustrating one example activity that could be accommodated by communication system 10. This particular flow may begin at 110, where the STP root priority of each vPC peer-switch is configured to be the lowest priority. At 120, the STP designated priority of each vPC peer-switch is configured to maintain VLAN loadbalancing. At 130, the STP bridge priority of each vPC peer-switch is configured to be higher than the root priority previously configured. At 140, the STP bridge priorities of the vPC peer-switches are configured to be the same value. At 150, one of the vPC peer-switches is configured to be the STP root of the other vPC peer-switch through a vPC peer-link.

Note that in certain example implementations, the network traffic disruption management described herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.). In some of these instances, a memory element (as shown in FIG. 2) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, peer-switch modules 30a-b may include software in order to achieve the network traffic disruption management outlined herein. In other example implementations, fail-shut modules 32a-b may include software in order to achieve the loop prevention as outlined herein. These activities can be facilitated by switches S1 12, S2 14, S3 18, and S4 20, and/or any of the elements of FIGS. 1-6D. Switches S1 12, S2 14, S3 18, and S4 20 can include memory elements for storing information to be used in achieving the intelligent switching control, as outlined herein. Additionally, switches S1 12, S2 14, S3 18, and S4 20 may include a processor that can execute software or an algorithm to perform the switching activities, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of clouds, networks, and/or switches, as well as more complicated/sophisticated arrangements and configurations. Accordingly, the examples provided herein should not limit the scope or inhibit the broad teachings of communication system 10 as potentially applied to a myriad of other architectures. Additionally, although described with reference to particular scenarios where peer-switch modules 30a-band fail-shut modules 32a-b are provided separately, these modules can be consolidated or combined in any suitable fashion, or provided in a single proprietary unit.

It is also important to note that the activities discussed with reference to FIGS. 1-7 illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in networking environments or arrangements, the present disclosure may be used in any communications environment that could benefit from such technology. Virtually any configuration that seeks to intelligently manage network traffic disruptions and/or switch packets could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

It should also be noted that an L2 gateway interconnect protocol (L2GIP) can be readily extended into the architecture of communication system 10. In such an implementation, each switch can be configured with appropriate mechanisms (e.g., hardware, software, etc.) in order to provide the L2GIP capabilities. L2GIP is a lightweight protocol that can loop-free interconnect, segmented STP domains. L2GIP can build adjacency over the vPC peer-link. L2GIP, by default, does not require periodic HELLO or keep-alive messages. L2GIP incrementally exchanges STP root summary updates over vPC peer-link to select a single uplink (root) port.

The L2GIP protocol running on the vPC peer-link can make the vPC-pair switch agree on the single uplink port and, hence, it makes the vPC-pair switch appear as a pseudo-bridge or virtual-switch. For example, the following operation details how L2GIP can block an STP loop for communication system 10. First, S2 14 can receive a superior BPDU from S1 12. Subsequently, L2GIP running on S2 14 can send the L2GIP claim (for uplink port P1, towards the STP root S1 12) message over the L2GIP adjacency (e.g., to the peer switch S3 18). Upon receiving the L2GIP claim on S3 18, the mechanism can ensure that the uplink port P2 (which is inferior to P1) is blocked, and then the L2GIP grant message would be sent to S2 14. Once the L2GIP grant message is received, S2 14 can set the uplink port P1 to forwarding. L2GIP is capable of point-to-multipoint claim-grant handshake and, therefore, can be easily extended to a multi-switch vPC complex. Moreover, the L2GIP claim-grant handshake can be performed for the uplink (root) port, and it is not required for designated ports such that it does not incur major scalability concerns.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   configuring a first network element as a peer to a second network element, wherein the first network element and the second network element are configured to execute a spanning-tree protocol (STP) in a network environment; and
   configuring a root bridge ID (BID) to be a same value for the first network element and the second network element such that both operate as root network elements for other network elements in the network environment;
   wherein the root BID comprises a bridge priority and a negotiated Virtual Port-Channel (vPC) media access control (VMAC) address.

2. The method of claim 1, wherein the first network element is configured to transmit Bridge Protocol Data Units (BPDUs) to the second network element through a vPC link.

3. The method of claim 2, wherein data in the BPDUs include the root BID providing a value for the bridge priority, and the negotiated VMAC address.

4. The method of claim 1, wherein a first designated BID value is provided to indicate that the first network element is a vPC operational primary switch, and a second designated BID value is provided to indicate that the second network element is a vPC operational secondary switch.

5. The method of claim 1, wherein the first network element and the second network element are configured to become a respective STP root bridge for a respective virtual local area network (VLAN).

6. The method of claim 1, wherein the first network element and the second network element are configured to exchange roles due to a failure of the first network element.

7. The method of claim 1, wherein the first network element is configured to designate its own priority level in order to conduct loadbalancing activities in conjunction with the second network element.

8. Logic encoded in non-transitory media that includes code for execution and when executed by a processor operable to perform operations comprising:
configuring a first network element as a peer to a second network element, wherein the first network element and the second network element are configured to execute a spanning-tree protocol (STP) in a network environment; and
configuring a root bridge ID (BID) to be a same value for the first network element and the second network element such that both operate as root network elements for other network elements in the network environment;
wherein the root BID comprises a bridge priority and a negotiated Virtual Port-Channel (vPC) media access control (VMAC) address.

9. The logic of claim 8, wherein the first network element is configured to transmit Bridge Protocol Data Units (BPDUs) to the second network element through a vPC link, wherein data in the BPDUs include the root BID providing a value for the bridge priority, and the negotiated VMAC address.

10. The logic of claim 8, wherein a first designated BID value is provided to indicate that the first network element is a vPC operational primary switch, and a second designated BID value is provided to indicate that the second network element is a vPC operational secondary switch.

11. The logic of claim 8, wherein the first network element and the second network element are configured to become a respective STP root bridge for a respective virtual local area network (VLAN).

12. The logic of claim 8, wherein the first network element and the second network element are configured to exchange roles due to a failure of the first network element.

13. The logic of claim 8, wherein the first network element is configured to designate its own priority level in order to conduct loadbalancing activities in conjunction with the second network element.

14. A first network element, comprising:
a memory element configured to store electronic code;
a processor operable to execute instructions associated with the electronic code; and
a peer-switch module configured to interface with the processor such that the first network element is capable of:
configuring itself as a peer to a second network element, wherein the first network element and the second network element are configured to execute a spanning-tree protocol (STP) in a network environment; and
configuring a root bridge ID (BID) to be a same value for the first network element and the second network element such that both operate as root network elements for other network elements in the network environment;
wherein the root BID comprises a bridge priority and a negotiated Virtual Port-Channel (vPC) media access control (VMAC) address.

15. The first network element of claim 14, wherein the first network element is further configured to transmit Bridge Protocol Data Units (BPDUs) to the second network element through a vPC link.

16. The first network element of claim 15, wherein data in the BPDUs include the root BID providing a value for the bridge priority, and the negotiated VMAC address.

17. The first network element of claim 14, wherein a first designated BID value is provided to indicate that the first network element is a vPC operational primary switch, and a second designated BID value is provided to indicate that the second network element is a vPC operational secondary switch.

18. The first network element of claim 14, wherein the first network element and the second network element are configured to become a respective STP root bridge for a respective virtual local area network (VLAN).

19. The first network element of claim 14, wherein the first network element and the second network element are configured to exchange roles due to a failure of the first network element.

20. The first network element of claim 14, wherein the first network element is configured to designate its own priority level in order to conduct loadbalancing activities in conjunction with the second network element.

* * * * *